US011734902B2

(12) United States Patent
Malik et al.

(10) Patent No.: US 11,734,902 B2
(45) Date of Patent: Aug. 22, 2023

(54) CONTEXTUAL CONTROL OF DIGITAL FILES BUILT ON THE BLOCKCHAIN AND PROJECTED IN AUGMENTED REALITY

(71) Applicant: Jadu AR Inc., La Canada Flintridge, CA (US)

(72) Inventors: Asad J. Malik, La Canada Flintridge, CA (US); Jack Gerrard, La Canada Flintridge, CA (US); Jake Sally, La Canada Flintridge, CA (US)

(73) Assignee: Jadu AR Inc., La Canada Flintridge, CA (US)

( * ) Notice: Subject to any disclaimer, the term of this patent is extended or adjusted under 35 U.S.C. 154(b) by 0 days.

(21) Appl. No.: 17/834,747

(22) Filed: Jun. 7, 2022

(65) Prior Publication Data

US 2022/0392176 A1    Dec. 8, 2022

Related U.S. Application Data

(60) Provisional application No. 63/197,742, filed on Jun. 7, 2021.

(51) Int. Cl.
| | | |
|---|---|---|
| *G06T 19/00* | (2011.01) | |
| *H04L 9/00* | (2022.01) | |
| *G06T 17/05* | (2011.01) | |
| *H04L 9/32* | (2006.01) | |
| *H04W 4/029* | (2018.01) | |

(52) U.S. Cl.
CPC ............ *G06T 19/006* (2013.01); *G06T 17/05* (2013.01); *H04L 9/3236* (2013.01); *H04L 9/50* (2022.05); *H04W 4/029* (2018.02); *H04L 2209/603* (2013.01)

(58) Field of Classification Search
CPC ...... G06T 19/006; G06T 17/05; H04W 4/029; H04L 9/50; H04L 9/3236
See application file for complete search history.

(56) References Cited

U.S. PATENT DOCUMENTS

2018/0078843 A1    3/2018   Tran et al.
2019/0130701 A1*   5/2019   Simons ............... G07F 17/3251
(Continued)

FOREIGN PATENT DOCUMENTS

WO  PCT/US2021/058576    * 11/2020  ............... G06N 3/04

OTHER PUBLICATIONS

International Search Report and Written Opinion in related international application PCT/US2022/032564 dated Oct. 5, 2022, pp. 1-10.

*Primary Examiner* — Oleg Korsak
(74) *Attorney, Agent, or Firm* — Pillsbury Winthrop Shaw Pittman, LLP; Chad Hammerlind

(57) ABSTRACT

Provided is a process including: identifying, with a computing system, a blockchain-based token mapped to an asset configured to be presented in an augmented reality application; obtaining, with the computing system, contextual information indicative of a physical context of a physical geo-location of a display upon which the augmented reality application is to present the asset; causing, with the computing system, visual attributes or audio attributes of the asset to be determined based on the contextual information; and causing, with the computing system, the asset to be presented with the display according to the visual attributes or the audio attributes.

36 Claims, 14 Drawing Sheets

(56) References Cited

U.S. PATENT DOCUMENTS

| | | |
|---|---|---|
| 2020/0005284 A1 | 1/2020 | Vijayan |
| 2020/0186338 A1 | 6/2020 | Andon et al. |
| 2020/0380747 A1 | 12/2020 | Canberk et al. |
| 2021/0014638 A1 | 1/2021 | Szymczyk et al. |
| 2022/0069996 A1* | 3/2022 | Xue .................... H04L 9/3239 |
| 2022/0239495 A1* | 7/2022 | Norton ................. H04L 9/0861 |
| 2022/0271915 A1* | 8/2022 | Turner ................. H04L 9/0618 |
| 2022/0300966 A1* | 9/2022 | Andon .................. G06Q 30/06 |

* cited by examiner

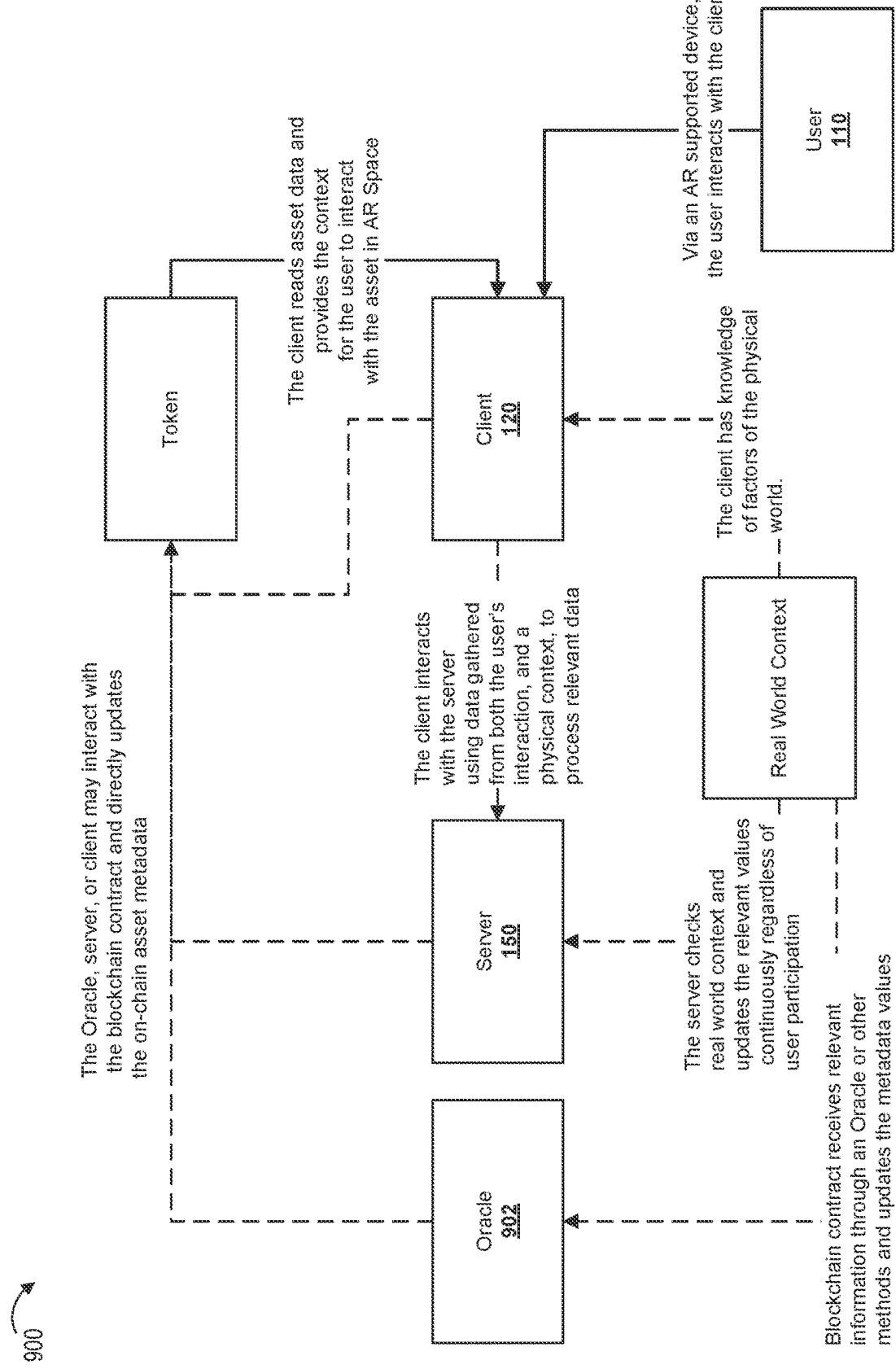

CONTEXTUAL CONTROL OF DIGITAL FILES BUILT ON THE BLOCKCHAIN AND PROJECTED IN AUGMENTED REALITY

CROSS-REFERENCE TO RELATED APPLICATIONS

This patent application claims priority to and the benefit of the filing date of provisional patent application having Application No. 63/197,742, filed on Jun. 7, 2021, which is incorporated herein in its entirety.

BACKGROUND

1. Field

The present disclosure relates generally to augmented reality and, more specifically, to contextual control of digital files built on a blockchain and projected in augmented reality.

2. Description of the Related Art

Augmented reality has experienced rapid uptake in recent years. Examples include various types of games and image-modification applications on mobile phones, as well as the same implemented on head-mounted augmented reality displays. Often, augmented reality experiences draw upon various assets, such as three-dimensional models or two-dimensional models and associated textures to be inserted into the physical environment the user is viewing through the augmented reality display.

SUMMARY

The following is a non-exhaustive listing of some aspects of the present techniques. These and other aspects are described in the following disclosure.

Some aspects include a process of identifying, with a computing system, an asset configured to be presented in an augmented reality application; obtaining, with the computing system, contextual information indicative of a physical context of a physical geolocation of a display upon which the augmented reality application is to present the asset; causing, with the computing system, visual attributes or audio attributes of the asset to be determined based on the contextual information; and causing, with the computing system, the asset to be presented with the display according to the visual attributes or the audio attributes.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements:

FIG. 9A is block diagram illustrating an example process of the method of FIG. 4, in accordance with some embodiments of the present disclosure;

Figure 1:
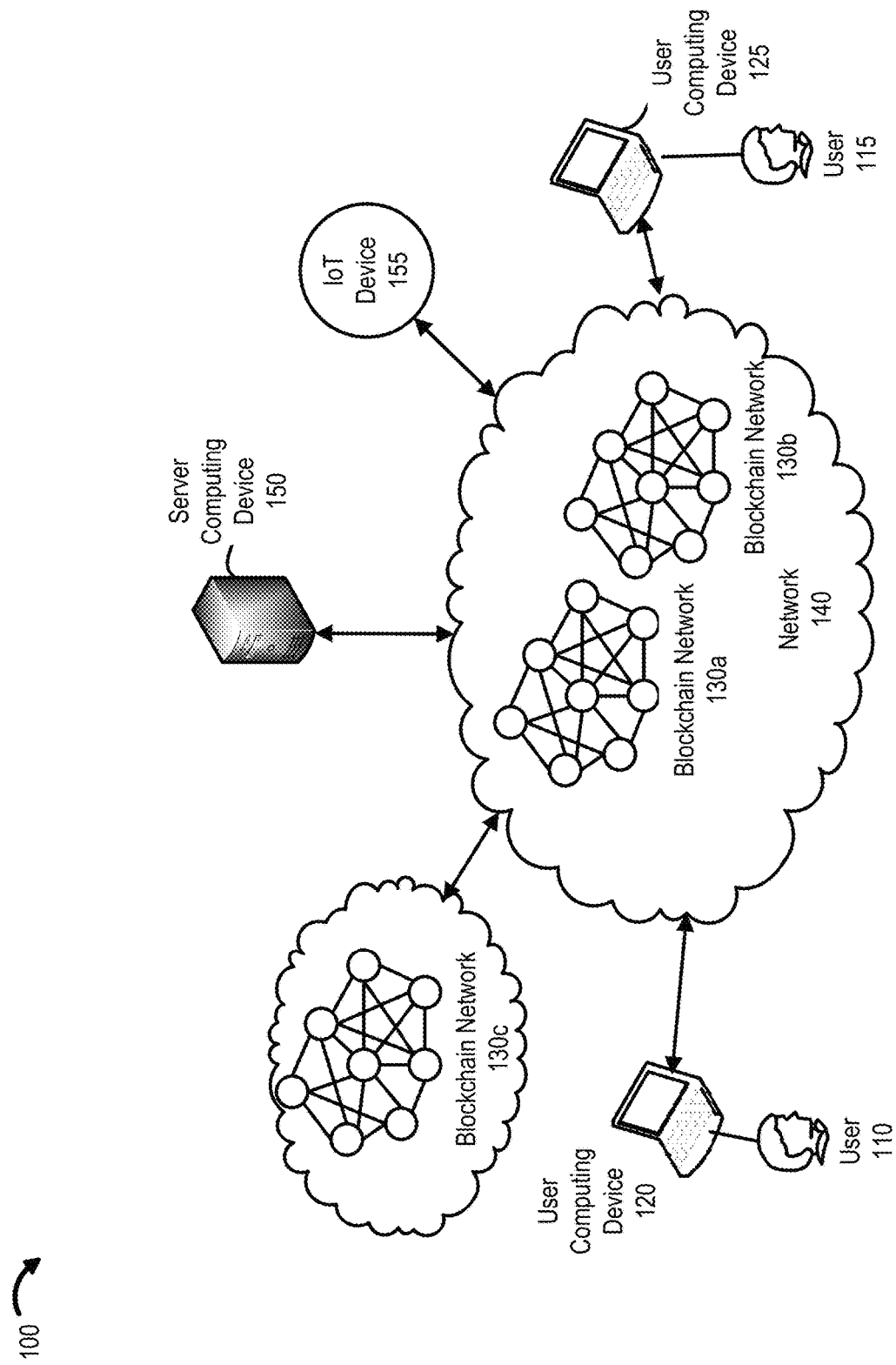
FIG. 1 is a block diagram illustrating a blockchain and augmented reality digital file contextual control system, in accordance with some embodiments of the present disclosure.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of augmented reality and decentralized applications. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

In existing systems, some types of content have been mapped to (for example linked to in a one-to-one relationship) nonfungible tokens on blockchain computing platforms. Examples include various types of media and artistic works for which nonfungible tokens have been designated as representative. These use cases, however, are generally not well suited for more interactive experiences, like those expected by users of augmented reality applications. In many cases, the content represented by the NFT is untethered to place and is static and unchanging, regardless of the user's current environment, for instance, an animated GIF may appear the same regardless of when or where the user views that animated GIF with traditional use cases. In many instances, these limitations arise from the technical characteristics of many blockchain computing platforms, which often struggle with latency issues that render dynamic mutation of aspects of the nonfungible token infeasible in timescales expected by users of augmented reality applications. (Discussion of these problems should not be taken as indicating that any subject matter is disclaimed, as various inventive aspects are described herein, and some of those inventive aspects may only address a subset of these issues or other issues.)

Some embodiments include a computing environment like that described below and referred to as Jadu. For nonfungible tokens, Jadu can add an additional layer of data structure and code called contextual controls. Contextual controls may take inputs from the physical world and subsequently alter how people see, manipulate and interact with digital assets in the real world through augmented reality. Contextual controls may include, but are not limited to (which is not to suggest that other lists are limiting) real world inputs such as geolocation, time of day, weather, cycles of the moon, etc. of the user having an augmented reality experience in which the corresponding asset is to be presented. In some cases, contextual parameters may include inertial or gravity-related parameters of an object in a scene, e.g., where AR displays are based on the physics of the object. In some cases, context may come from the generated virtual overlay on the physical world, e.g., the mapping of an AR asset in one geolocation may cause aspects of another AR asset at a nearby (e.g., within a field of view) geolocation to be modified in response.

Example data structures that may be used to facilitate contextual controls include various blockchain solutions to facilitate scaled implementations. In some embodiments, the contextual controls can be integrated across chains, allowing for interplay between digital assets minted on multiple chains such as Flow, Ethereum, Tezos, Hyperledger, EOS, NEO, etc.

Examples of Inputs for Contextual Controls include the following:

a. Geolocation: An NFT displayed via AR in the Jadu app is geofenced to only be visible in Time Square. If Jadu users try to view the NFT in the Jadu app when physically located outside of Time Square the NFT will be unavailable.

b. Temporal: An NFT tree sapling displayed via AR in the Jadu app will begin to grow into a full tree over the course of multiple months of real-world time.

c. Weather: An NFT flower displayed via AR in the Jadu app would appear in full bloom if the real-world weather is sunny. However, that same NFT flower displayed via AR in the Jadu app will appear shriveled and closed if the weather is raining.

d. Moon Cycle: An NFT of a miniature lake displayed via AR in the Jadu app will show the water levels at low tide or high tide depending on if the real-world moon is full or only a quarter.

In some cases, the above-described computing environment (or others in the spirit of the present techniques) may be implemented on a variety of different physical architectures. Some embodiments may include an developer's computer, an experience developer's computer, a population of mobile devices upon which augmented reality is experienced by users, a decentralized computing platform (like a blockchain-based computing platform among the examples listed above), an repository storing assets used in augmented reality experiences (for example in a decentralized data store, like interplanetary file system or FileCoin or a centralized repository or a hybrid content delivery network architecture), servers from which augmented reality applications are downloaded by the mobile devices to invoke those assets, and a network connecting these components, like the Internet, which may connect various geographically distributed portions of this example physical architecture. In some embodiments, the components may have the features of the computing device described below with reference to FIG. 6.

In some cases, assets for augmented reality experiences may be developed with an asset developer's computer connected to such a network. In some embodiments, asset developers may use various computer aided design and game development software tools to define two-dimensional or three-dimensional models of assets and to specify their functionality. In some embodiments, that functionality may include event handlers that respond to various user inputs, like gazing at the asset, pointing at the asset, clicking on the asset, talking to the asset, or moving in the presence of the asset in an augmented reality experience. These event handlers may invoke scripts bound to the asset that cause the visual appearance or audible appearance of the asset to change, for instance, appearing to physically move in space in the augmented reality experience, change configuration, change color, update the state of the asset in a game loop, or the like.

The assets may further be bound to contextual control scripts like those discussed above that specify attributes of the asset displayed or presented to the user (like visual or audible attributes) based upon the context of the augmented reality experience in the physical world. In some embodiments, the scripts may be defined by the asset developer, using the asset developer's computer and, for example, an independent development environment. In some embodiments, contextual control scripts may take various arguments when invoked that cause the script to make such changes responsive to the arguments. Examples include the various inputs for contextual controls described above, like geolocation, temporal, weather, moon cycle, as well as others, like ambient lighting, speed or velocity, altitude, ambient sound, barometric pressure, orientation with respect to the physical world, orientation with respect to an ultra-wideband transmitter, proximity to various wireless beacons, events from various worn computing devices (like smart watches and handheld controllers with inertial measurement units and buttons), the presence or relative pose of other users mobile devices, and the like.

The contextual arguments may depend upon the user's current context in the physical world, and those aspects of context may be something that the user can perceive in the absence of the augmented reality display in some cases, thereby adding to the immersiveness of the experience. In some embodiments, these contextual control scripts may be interpreted or compiled into a smart contract executable on a blockchain computing platform storing the nonfungible token corresponding to the asset, and such scripts may be executable by calling an address on the blockchain computing platform associated with that nonfungible token, invoking the corresponding script, and supplying the corresponding arguments, for example, from a user's mobile device. Some embodiments may implement an NFT tree configured such that each time a user taps anywhere in the world, it grows a leaf that directly modifies the minted NFT's properties so it effects its presence on all devices.

Some embodiments may further include an experience developer's computer. In some embodiments, the experience developer may construct augmented reality experiences, for instance, designating nonfungible tokens or collections thereof, along with other assets to be shown or otherwise displayed to users in augmented reality experiences as part of augmented reality applications composed by the experience developer and execute on users' mobile computing devices. In some embodiments, experience developers may have credentials by which they authenticate their applications to invoke various assets corresponding to nonfungible tokens and wallet accounts from which crypto currency may be transferred to compensate asset developers or a nonfungible token holders for use of the asset represented by a nonfungible token.

The NFT may include a script that allows a party that owns the NFT, e.g., can demonstrate possession of a private key corresponding to the wallet account or address at which a distributed ledger designates the NFT as belonging, to change attributes of the asset, e.g., changing a geolocation to which the NFT is mapped and where it will be shown in the AR application, adding their content to the NFT like text or logos, or enabling or disabling functionality. In some cases, the NFT may be mapped to a specific geolocation and only shown in AR displays that have that geolocation in their field of view. In some cases, users may spawn new NFTs or other stored content depicting the asset in combination with their AR experience, e.g., video showing the user interacting with the assets in a physical place. In some embodiments, the contextual controls of an AR asset mapped to an NFT may be adjustable by the owner of the NFT.

In some embodiments, the mobile devices upon which augmented reality experiences are presented may take a variety of forms, like those examples described above, including smart phones, tablets, head-mounted displays (e.g., AR headsets and glasses), windshield displays in automobiles, and the like. In some embodiments, the mobile computing device may include sensors by which contextual signals are gathered or upon which they are based, examples including a geolocation sensor, a beacon sensor, ultra-wideband sensors, a camera, a barometric pressure sensor, a compass, an inertial measurement unit (e.g., a six axis IMU), a depth sensing camera (for example based upon projected structured light, time-of-flight, a lidar sensor, or other approaches), or the like. In some embodiments, the application composed by the developer may register to receive events from these various sensors and in some cases request additional information, like weather or moon cycle from remote third-party servers via an application program interface, an oracle (e.g., Chainlink), or a third party data feed to enrich contextual signals, for instance, to identify the current or forecasted weather or moon cycle at the user's current geolocation or time of day. In some cases, contextual controls may be based on proximity (e.g., geographic proximity of geolocations to which they are mapped) or state of AR assets mapped to other NFTs.

As noted, the physical architecture may further include a decentralized computing platform, like a blockchain computing platform. In some embodiments, the decentralized computing platform may be an un-trusted or trusted computing platform. Some embodiments may involve a relatively large number, like more than 100 or more than 10,000, peer nodes executing peer applications upon which the computing platform is implemented. In some embodiments, those peer nodes may maintain accounts or transaction ledgers by which ownership of a nonfungible token and various tokens of cryptographic currency (e.g., fungible tokens) are tracked and transacted. In some embodiments, the contextual control scripts may also be executed by peer nodes, for example using verifiable computing techniques, like having a plurality of the peer nodes execute the script and then execute a consensus algorithm to determine whether all peer nodes or more than a percentage, like a majority, produce the same result of executing the script with a given set of arguments.

In some embodiments, the peer nodes may also maintain a directed acyclic graph of cryptographic hash pointers (or other cryptographic accumulators) by which state of accounts or transactions and nonfungible tokens are maintained in a tamper evident, Byzantine fault-tolerant, decentralized manner. Examples include a blockchain or other similar data structures. In some embodiments, additions to this distributed ledger may be made in chunks, for example blocks, having a collection of changes in state, like transactions, stored in leaf nodes of a Merkle tree or Patricia trie to facilitate relatively fast detection of tampering by malicious actors. In some cases, program state may be maintained in a distinct decentralized acyclic graph of cryptographic hash pointers from that used to track ownership of NFTs and fungible tokens.

In some embodiments, the peer nodes may execute a consensus algorithm to determine a current state of the decentralized acyclic graph of cryptographic hash pointers, for instance, voting to determine whether to accept a version of the graph, like a version of a blockchain as authentic and correct. In some embodiments, the peer nodes may execute a consensus algorithm like Paxos, HotStuff, Raft, or the like to determine a result of executing scripts and a state of a distributed ledger, such as one encoded in one of the above described graphs. In some embodiments, participating in the consensus algorithm may be conditioned upon demonstrating that a peer node has consumed some rivalrous or otherwise scarce asset, like proof-of-work (for instance, computing a hash collision to a threshold number of significant digits), proof-of-stake, proof-of-storage, proof-of-identity, or proof-of-space or time.

In some embodiments, certain operations executed on the decentralized computing platform may be expedited with a layer two scaling solution to impart lower latency, which may be beneficial in certain augmented reality use cases. Examples include state channels, plasma, or various kinds of rollups, like zero knowledge rollups, optimistic rollups, and the like.

The nonfungible tokens may be implemented according to a variety of standards, examples including the ERC-721 standard, the ERC-1155 standard, the TZIP-12 standard, composable nonfungible token standards (e.g., ERC-998) or other nonfungible token standard that would be apparent to one of skill in the art in possession of the present disclosure (the contents of which are hereby incorporated by reference).

Some embodiments may further include an asset repository where content by which the asset is implemented may be stored, like texture image files, three-dimensional models (e.g., polygon meshes), audio files, event handlers, and the like. In some embodiments, the asset repository may be on-chain or, to expedite access, the asset repository may be stored off-chain, in some cases with a cryptographic hash of the asset stored on chain in association with the nonfungible token and in association with a pointer associated with the nonfungible token that identifies the off-chain address. In some embodiments, the content may be stored in a decentralized content repository, for instance, according to the interplanetary file system protocol or with FileCoin. In some embodiments, an address of the content may be stored as an attribute of the NFT on-chain. Or in some cases, the content may be stored in a content delivery network, in cache memory of the mobile computing device executing the augmented reality application, or in a developer's server. The mobile computing device, upon executing a game, may retrieve these assets if stored off device, e.g., by caching assets mapped to geolocations within a threshold distance (e.g., 50 m) of the device's geolocation.

Some embodiments may further include servers from which games or other augmented reality applications are downloaded by the mobile computing devices upon which they are experienced. Examples include walled gardens of native applications hosted by providers of mobile operating systems, video game distribution platforms, and servers operated by entities providing and supporting operation of augmented reality applications, whether in the cloud or on premises.

In operation, a user of a mobile device may interact with their mobile device to launch an augmented reality application, which may have been previously downloaded from one of the above-described sources. In some embodiments, the augmented reality application may register with the operating system to receive information related to contextual arguments, for example requesting a geolocation of the mobile device or any of the other types of information, in some cases registering to receive updates to these parameters, for instance, with a callback function.

The augmented reality application may then invoke one or more nonfungible tokens corresponding to assets used in the augmented reality experience. Some embodiments may select those assets and corresponding NFTs designated as being proximate (e.g., within a threshold distance, in the same room, or in the field of view of the device's camera) to the device's geolocation in physical space. In some embodiments, this may include calling a script executed on-chain by which the instance of the augmented reality application authenticates itself to use the asset. In some cases, this process may include transferring cryptographic tokens from a wallet address of the user or the experience developer to a wallet address of a current owner of the nonfungible token, as compensation for use of the asset. In some embodiments, the nonfungible token may identify an address of the content by which the asset is to be presented in the asset repository, and in some cases along with a cryptographic hash of the content for purposes of detecting tampering with the content (e.g., comparing the cryptographic hash to a cryptographic hash generated from received content to determine a match in the cryptographic hashes). In some embodiments, the mobile device, at the instruction of the augmented reality application, may call a set of contextual control scripts of the nonfungible token or tokens, specifying an address of the nonfungible token or tokens on the blockchain computing platform, and specifying arguments related to contexts, like those examples described above. In some embodiments, this may cause a state of the asset to be specified by the decentralized computing platform. Or in some embodiments, the contextual controls may be executed off-chain, for instance in the mobile computing device or in the servers of the provider of the augmented reality application.

In some embodiments, the augmented reality application, by invoking an augmented reality library or framework of the operating system of the mobile computing device or third party hardware, may then determine position, orientation, and scale of the asset in a three-dimensional map of the physical environment of the mobile computing device, which in some cases may be determined with simultaneous localization and mapping techniques, examples including scanning with lidar, time-of-flight depth mapping cameras, structured light projecting depth cameras, and inferring depth maps based upon stereoscopic imaging and visual odometry.

Some embodiments may determine which pixels of a frame of video captured by the augmented reality application are to be occluded by the asset and which pixels of a projection of the asset into the physical environment are occluded by which pixels of the physical environment, for instance, by a person walking in front of the asset. Some embodiments may further determine changes due to shading and lighting that affect the appearance of the asset based upon the location and other characteristics of lighting in the physical environment. Some embodiments may change pixels in the frame of video captured by the AR application to depict the asset based upon these determinations, for instance, overwriting various pixels to cause the frame to depict the asset as if it was physically present in the physical environment, and some embodiments may then cause that frame to be displayed, for instance, on a smart phone, in a stereoscopic head-mounted display, in some cases with foveated rendering and variable focal displays in a head-mounted display. In some cases, the display may be updated at greater than 24, 90, or 120 frames per second.

Some embodiments may expose a UI or API that supports operations by which an administrator may curate or block certain content from being on applications. For example, an administrator may block, geofence, or takedown an asset after a user uploads an NFT at a geographic location that goes against company values, local law, or community norms, in some embodiments.

In some embodiments, a distributed ledger in a blockchain framework is stored, maintained, and updated in a peer-to-peer network. In one example the distributed ledger maintains a number of blockchain transactions. FIG. 1 shows an example blockchain and augmented reality digital file contextual control system 100 for facilitating a blockchain transaction. The blockchain and augmented reality digital file contextual control system 100 includes a user computing device 120, a user computing device 125, a server computing device 150, and an Internet of Things (IoT) device 155 interconnected via a network 140. The user computing device 120, the user computing device 125, the server computing device 150 may be a computing system 1000 described in more detail with reference to FIG. 10. The IoT device 155 may comprise any of a variety of devices including vehicles, home appliances, embedded electronics, software, sensors, actuators, thermostats, light bulbs, door locks, refrigerators, RFID implants, RFID tags, pacemakers, wearable devices, smart home devices, cameras, trackers, pumps, POS devices, a variety of sensors (e.g., a temperature sensor, a motion sensor, a pressure sensor, a light sensor, a precipitation sensor, a positioning sensor (e.g., global positioning system (GPS), an accelerometer, or other sensors that would be apparent to one of skill in the art in possession of the present disclosure), and stationary and mobile communication devices along with connectivity hardware configured to connect and exchange data. For example, as discussed herein, the IoT device 155 may comprise an environmental sensor system. The network 140 may be any of a variety of available networks, such as the Internet, and represents a worldwide collection of networks and gateways to support communications between devices connected to the network 140. The blockchain and augmented reality digital file contextual control system 100 may also comprise one or more distributed or peer-to-peer (P2P) networks, such as a first, second, and third blockchain network 130a-c (generally referred to as blockchain networks 130). As shown in FIG. 1, the network 140 may comprise the first and second blockchain networks 130a and 130b. The third blockchain network 130c may be associated with a private blockchain as described below with reference to FIG. 2, and is thus, shown separately from the first and second blockchain networks 130a and 130b. Each blockchain network 130 may comprise a plurality of interconnected devices (or nodes). As discussed above, a ledger, or blockchain, is a distributed database for maintaining a growing list of records comprising any type of information. A blockchain may be stored at least at multiple nodes (or devices) of the one or more blockchain networks 130.

In one example, a blockchain based transaction may generally involve a transfer of data or value between entities, such as a user 110 of the user computing device 120 and a user 115 of the user computing device 125 in FIG. 1. The server computing device 150 may include one or more applications, for example, a transaction application configured to facilitate the transaction between the entities by utilizing a blockchain associated with one of the blockchain networks 130. As an example, the user 110 may request or initiate a transaction with the user 115 via a user application executing on the user computing device 120. The transaction may be related to a transfer of value or data from the user 110 to the user 115. The user computing device 120 may send a request of the transaction to the server computing device 150. The server computing device 150 may send the requested transaction to one of the blockchain networks 130 to be validated and approved as discussed below.

Figure 2:
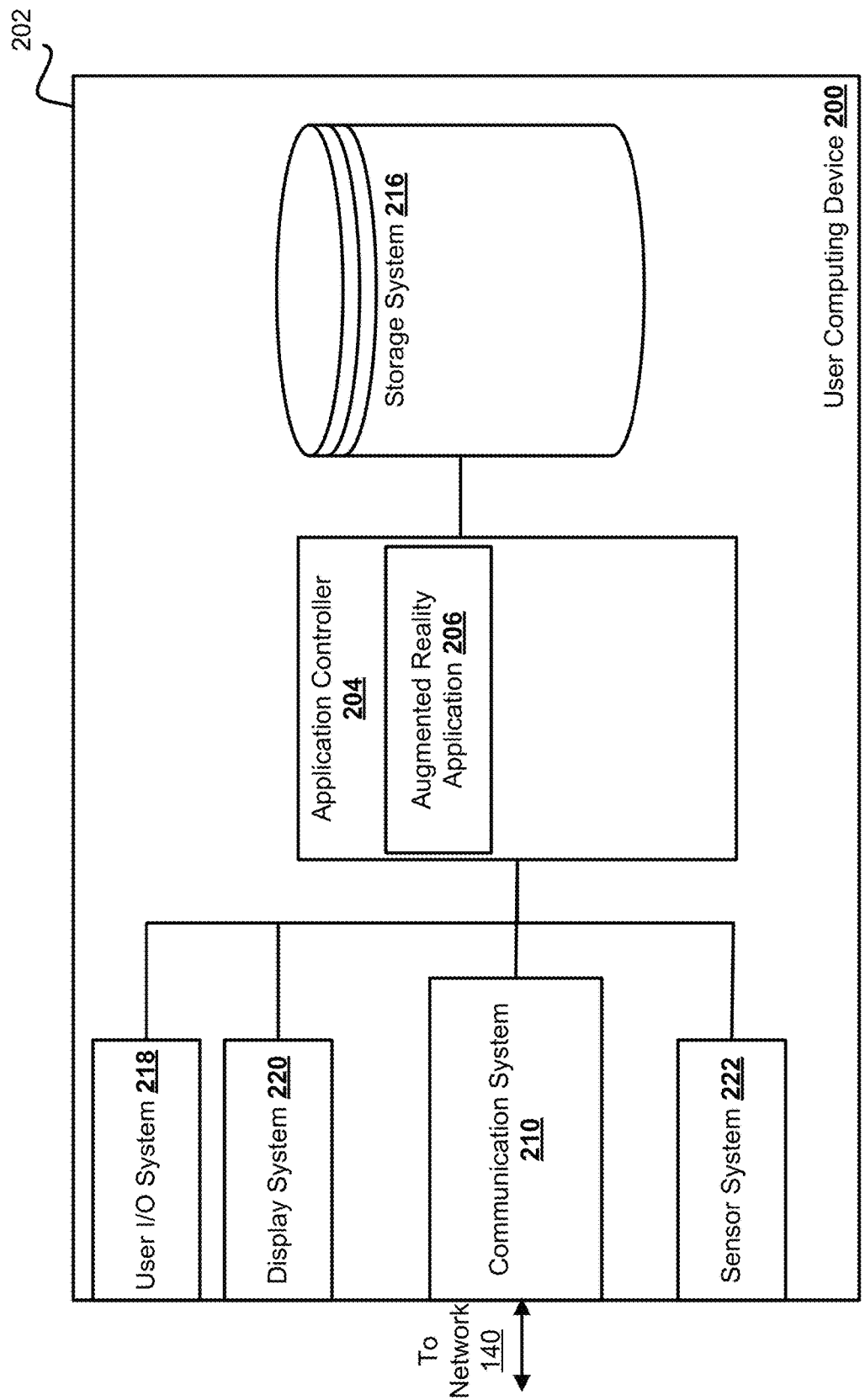
FIG. 2 is a block diagram illustrating a user computing device of the blockchain and augmented reality digital file contextual control system of FIG. 1, in accordance with some embodiments of the present disclosure.

FIG. 2 illustrates an embodiment of a user computing device 200 that may be the user computing device 120 and the user computing device 125 discussed above with reference to FIG. 1. In the illustrated embodiment, the user computing device 200 includes a chassis 202 that houses the components of the user computing device 200. Several of these components are illustrated in FIG. 2. For example, the chassis 202 may house a processing system and a non-transitory memory system that includes instructions that, when executed by the processing system, cause the processing system to provide an application controller 204 that is configured to perform the functions of the application controller, augmented reality devices, or the user computing devices discussed below. In the specific example illustrated in FIG. 2, the application controller 204 is configured to provide an augmented reality application 206, discussed below.

The chassis 202 may further house a communication system 210 that is coupled to the application controller 204 (e.g., via a coupling between the communication system 210 and the processing system). The communication system 210 may include software or instructions that are stored on a computer-readable medium and that allow the user computing device 200 to send and receive information through the communication networks discussed above. For example, the communication system 210 may include a communication interface to provide for communications through the network 140 as detailed above (e.g., first (e.g., long-range) transceiver). In an embodiment, the communication interface may include a wireless antenna that is configured to provide communications with IEEE 802.11 protocols (Wi-Fi), cellular communications, satellite communications, other microwave radio communications or communications. The communication system 210 may also include a communication interface (e.g., the second (e.g., short-range) transceiver) that is configured to provide direct communication with other user computing devices, sensors, storage devices, beacons, and other devices included in the blockchain and augmented reality digital file contextual control system 100 discussed above with respect to FIG. 1. For example, the communication interface may include a wireless antenna that configured to operate according to wireless protocols such as Bluetooth®, Bluetooth® Low Energy (BLE), near field communication (NFC), infrared data association (IrDA), ANT®, Zigbee®, Z-Wave® IEEE 802.11 protocols (Wi-Fi), or other wireless communication protocols that allow for direct communication between devices.

The chassis 202 may house a storage device (not illustrated) that provides a storage system 216 that is coupled to the application controller 204 through the processing system. The storage system 216 may be configured to store data, applications, or instructions described in further detail below and used to perform the functions described herein. In various embodiments, the chassis 202 also houses a user input/output (I/O) system 218 that is coupled to the application controller 204 (e.g., via a coupling between the processing system and the user I/O system 218). In an embodiment, the user I/O system 218 may be provided by a keyboard input subsystem, a mouse input subsystem, a track pad input subsystem, a touch input display subsystem, a microphone, an audio system, a haptic feedback system, or any other input subsystem. The chassis 202 also houses a display system 220 that is coupled to the application controller 204 (e.g., via a coupling between the processing system and the display system 220) and may be included in the user I/O system 218. In some embodiments, the display system 220 may be provided by a display device that is integrated into the user computing device 200 and that includes a display screen (e.g., a display screen on a laptop/notebook computing device, a tablet computing device, a mobile phone, AR glasses, or other wearable devices), or by a display device that is coupled directly to the user computing device 200 (e.g., a display device coupled to a desktop computing device by a cabled or wireless connection).

The chassis 202 may also house a sensor system 222 that may be housed in the chassis 202 or provided on the chassis 202. The sensor system 222 may be coupled to the application controller 204 via the processing system. The sensor system 222 may include one or more sensors that gather sensor data about the user computing device 200, a user (e.g., the user 110 or user of the user computing device 200, an environment around the user computing device 200 or other sensor data that may be apparent to one of skill in the art in possession of the present disclosure. For example, the sensor system 222 may include a geolocation sensor (e.g., a global positioning system (GPS) receiver, a real-time kinematic (RTK) GPS receiver, a differential GPS receiver, a Wi-Fi based positioning system (WPS) receiver, an accelerometer, a gyroscope, a compass, or any other sensor for detecting or calculating orientation, position, or movement), a beacon sensor, ultra-wideband sensors, a camera, a barometric pressure sensor, a compass, an inertial measurement unit (e.g., a six axis IMU), a depth sensing camera (for example based upon projected structured light, time-of-flight, a lidar sensor, or other approaches), other imaging sensors (e.g., a three-dimensional image capturing camera, an infrared image capturing camera, an ultraviolet image capturing camera, similar video recorders, or a variety of other image or data capturing devices that may be used to gather visual information from a physical environment surrounding the user computing device 200), biometric sensors, an actuator, a pressure sensor, a temperature sensor, an RFID reader/writer, an audio sensor, an anemometer, a chemical sensor (e.g., a carbon monoxide sensor), or any other sensor that would be apparent to one of skill in the art in possession of the present disclosure. While a specific user computing device 200 has been illustrated, one of skill in the art in possession of the present disclosure will recognize that computing devices (or other devices operating according to the teachings of the present disclosure in a manner similar to that described below for the user computing device 200) may include a variety of components and/or component configurations for providing conventional computing device functionality, as well as the functionality discussed below, while remaining within the scope of the present disclosure as well.

Figure 3:
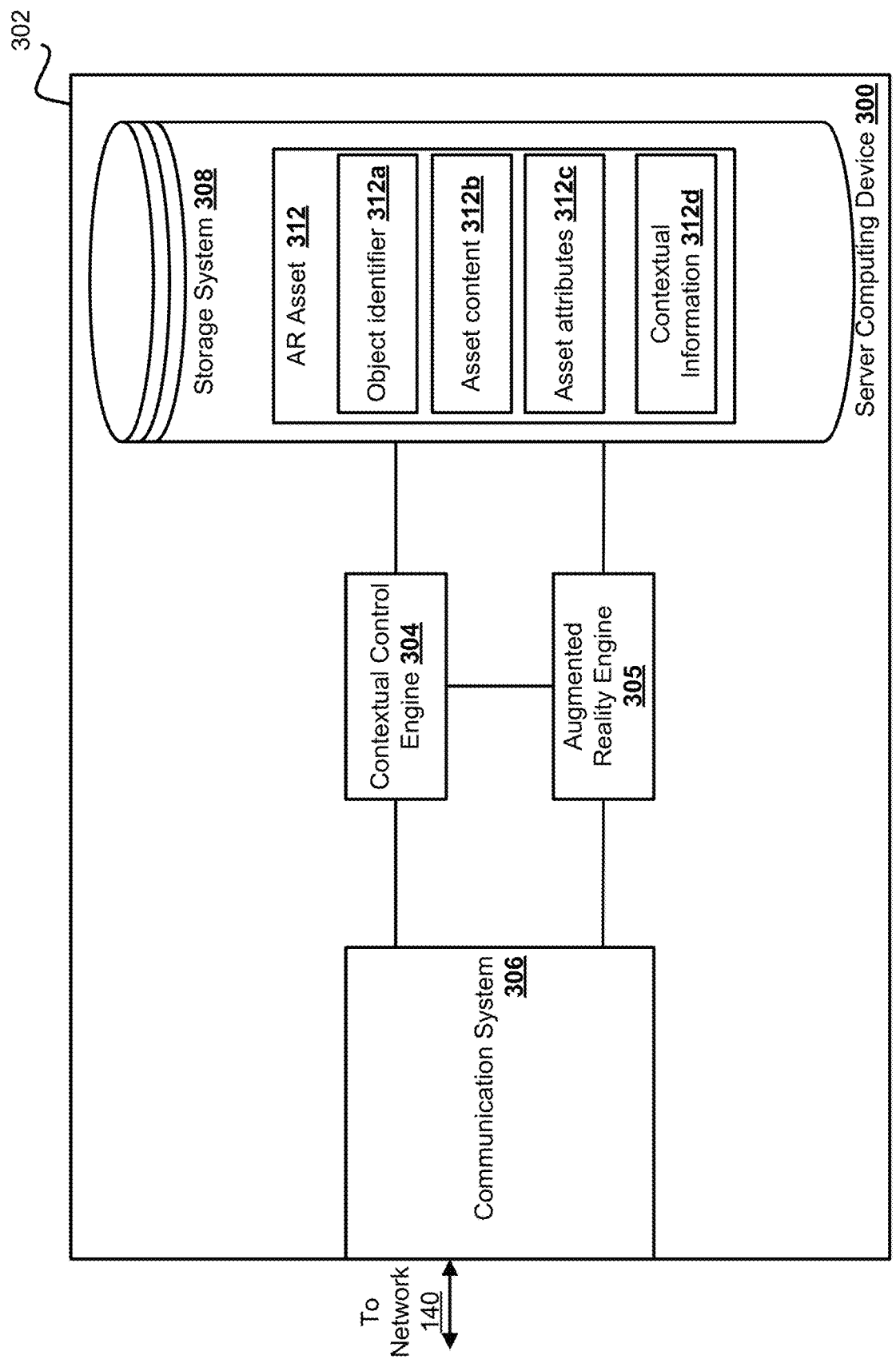
FIG. 3 is a block diagram illustrating a server computing device of the blockchain and augmented reality digital file contextual control system of FIG. 1, in accordance with some embodiments of the present disclosure.

FIG. 3 depicts an embodiment of a server computing device 300, which may be the server computing device 150 discussed above with reference to FIG. 1. In the illustrated embodiment, the server computing device 300 includes a chassis 302 that houses the components of the server computing device 300, only some of which are illustrated in FIG. 3. For example, the chassis 302 may house a processing system (not illustrated) and a non-transitory memory system (not illustrated) that includes instructions that, when executed by the processing system, cause the processing system to provide a contextual control engine 304 that is configured to perform the functions of the data contextual controller or server computing device discussed below. The processing system and the non-transitory memory system that includes instructions that, when executed by the processing system, cause the processing system to provide an augmented reality engine 305 to perform the augmented reality functionality, discussed below. While the augmented reality engine 305 and the contextual control engine 304 are illustrated as being housed in the same chassis 302, the augmented reality engine 305 in the contextual control engine 304 may be housed in separate server computing devices or be distributed between more than one server computing device.

The chassis 302 may further house a communication system 306 that is coupled to the contextual control engine 304 or the augmented reality engine 305 (e.g., via a coupling between the communication system 306 and the processing system) and that is configured to provide for communication through the network 140 of FIG. 1 as detailed below. The communication system 306 may allow the server computing device 300 to send and receive information over the network 140 of FIG. 1. The chassis 302 may also house a storage device (not illustrated) that provides a storage system 308 that is coupled to the contextual control engine 304 or the augmented reality engine 305 through the processing system. The storage system 308 may include one or more augmented reality assets 312 that may each include an object identifier 312*a*, asset content 312*b*, asset attributes 312*c*, and contextual information 312*d*. However, other data or instructions to complete the functionality discussed herein is contemplated. In various embodiments, the storage system 308 may be provided on the server computing device 300 or on a database accessible via the communication system 306. While a specific server computing device 300 has been illustrated, one of skill in the art in possession of the present disclosure will recognize that computing devices (or other devices operating according to the teachings of the present disclosure in a manner similar to that described below for the user computing device 200) may include a variety of components and/or component configurations for providing conventional computing device functionality, as well as the functionality discussed below, while remaining within the scope of the present disclosure as well.

Figure 4:
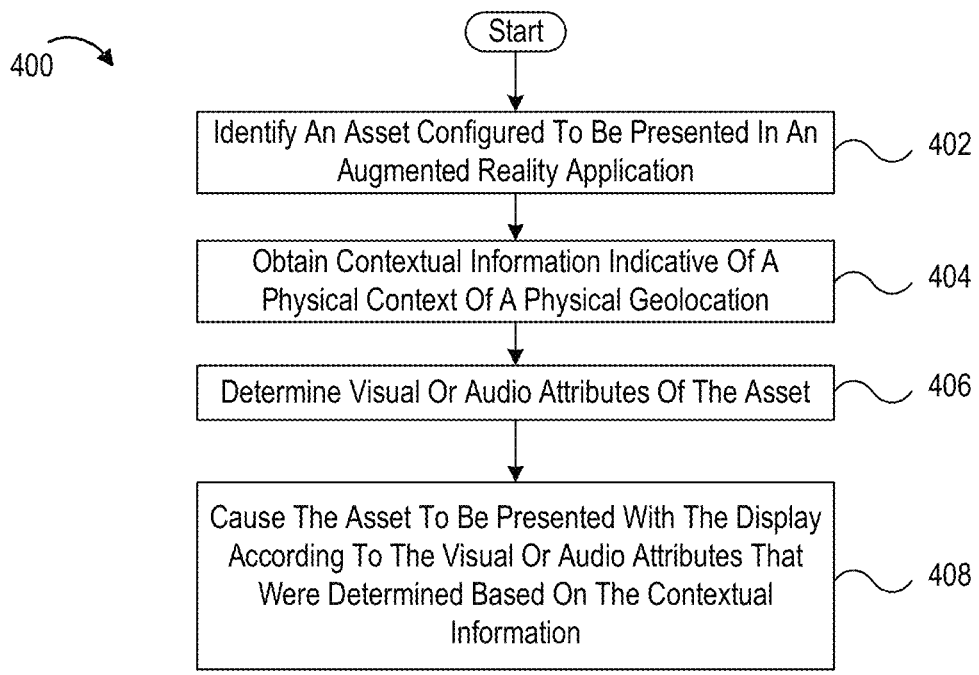
FIG. 4 is a flow diagram illustrating an example method of digital file contextual control, in accordance with some embodiments of the present disclosure.

FIG. 4 illustrates a method 400 for providing contextual control of digital files. The method 400 may begin at block 402 where an asset configured to be presented in an augmented reality application is identified. In an embodiment, at block 402, the contextual control engine 304 may identify an augmented reality asset 312. In some embodiments, the contextual control engine 304 may identify a nonfungible token recorded on a blockchain provided by the blockchain network 130*a*, 130*b*, or 130*c* of FIG. 1 that is mapped to the augmented reality asset 312. For example, the user 110 of the user computing device 120 of FIG. 1 may be traversing or viewing an environment with the user computing device 120. The user computing device 120 may be operating the augmented reality application 206. The augmented reality application 206 may be communicating with the augmented reality engine 305 provided on the server computing device 300, which may be the server computing device 150 of FIG. 1. As such, the augmented reality application 206 may have access to an augmented reality asset 312 that is stored on the storage system 308. However, as discussed herein, augmented reality asset 312 may be mapped to an NFT on a blockchain provided by the blockchain network 130*a*, 130*b*, or 130*c* of FIG. 1. In some cases, the augmented reality asset or NFT may be mapped to a specific geolocation and only identified when the user computing device 120 has that geolocation in their field of view. For example, the augmented reality application 206 may obtain location information from the sensor system 222. The augmented reality application 206 may provide the location information to the server computing device 150/300 via the network 140. The server computing device 150/300 may then use the location information to identify augmented reality assets that are within a threshold distance from the location at which the user computing device 120 is located. However, in other embodiments, the server computing device 300 may identify that the user computing device 120 is located within a geofence and may identify the augmented reality assets that are located within that geofence.

In some embodiments, only augmented reality assets that are associated with the user 110 of the user computing device 120 may be identified. For example, NFTs mapped with augment reality assets may be identified through a digital wallet associated with the user 110. In yet other embodiments, the augmented reality asset may be identified by the augmented reality application 206 when the user 110 provides an input, via the user I/O system 218, to spawn a new or an existing augmented reality asset in combination with their augmented reality experience.

The method 400 may proceed to block 404 where contextual information indicative of a physical context of a physical geolocation of a display upon which the augmented reality application is to present is obtained. In an embodiment, at block 404, the contextual control engine 304 may obtain contextual information indicative of physical context of a physical geolocation of the user computing device 120 upon which the augmented reality application 206 presents assets. For example, the contextual control engine 304 may receive sensor data from the user computing device 120 or other user computing devices such as the user computing device 125. Specifically, the sensor data maybe gathered via the sensor system 222 included on the user computing device 120 or the user computing device 125. The user computing devices 120 or 125 may send the sensor data via the network 140 to the server computing device 150/300. The contextual control engine 304 may derive contextual information from the sensor data. In other embodiments, the contextual control engine 304 may receive sensor data from IoT devices 155, which may be dispersed in various environments. In yet other embodiments, the contextual control engine 304 may receive sensor data or contextual information derived from sensor data from a third-party service such as an oracle. Oracles may be utilized to retrieve off-chain resource information and push this to the blockchain. Oracles may be software applications, such as a big data application, or hardware, such as an IoT or a smart device. For example, an oracle service may evaluate received temperature readings beforehand and then push this information to a smart contract or the contextual control engine 304.

The method 400 may then proceed to block 406 where visual or audio attributes of the asset may be determined or caused to be determined based on the contextual information. In an embodiment, at block 406, the contextual control engine 304, may determine visual or audio attributes of the asset based on the contextual information. In other embodiments, the contextual control engine 304 may provide the contextual information to the augmented reality engine 305 or the augmented reality application 206. In other embodiments, the augmented reality engine 305 or the augmented reality application 206 may determine the visual or audio attributes of the asset. In some embodiments, the user computing device 120/200, at the instruction of the augmented reality application 206, may call a set of contextual control scripts of the nonfungible token or tokens, specifying an address of the nonfungible token or tokens on the blockchain computing platform, and specifying arguments related to contexts, like those examples described above. In some embodiments, this may cause a state of the asset such as its visual or audio attributes to be specified by the decentralized computing platform. As such, in some embodiments the contextual control engine 304 may be provided as a smart contract on a blockchain. Or in some embodiments, the contextual controls may be executed off-chain, for instance in the user computing device 120 or in the server computing device 150 of the provider of the augmented reality application (e.g., the augmented reality engine 305).

The method 400 may then proceed to block 408 where an asset is caused to be presented with the display according to the visual or audio attributes that were determined based on the contextual information. In an embodiment, at block 408, the contextual control engine 304, the augmented reality engine 305, or the augmented reality application 206 may present, or cause to be presented, the asset with the display included on the display system 220 of the user computing device 120/200 according to the visual or audio attributes that were determined based on the contextual information. For example, the contextual information 312d may cause changes to the asset attributes 312c. The asset attributes 312c may adjust, or cause to be selected, corresponding the asset content 312b. The asset content 312b (e.g., visual or audio content) may be presented or cause to be presented, via the augmented reality application 206, on the display included on the display system 220 of the user computing device 120.

The method 400 may then return to block 402 where the asset is reidentified or a second asset is identified based on the user computing device moving positions or something changing in the environment where another asset will augment the users view of the environment. The method 400 may further obtain second contextual information of the physical context of the physical geolocation of the display upon which the augmented reality application is to present the asset as in block 404. The method 400 may then proceed such that the visual attributes or the audio attributes of the asset are to be updated based on the second contextual information, as in block 406. In the second rendition of block 408, the asset may be presented with the display according to the updated visual or audio attributes, as described above.

Figure 5A:
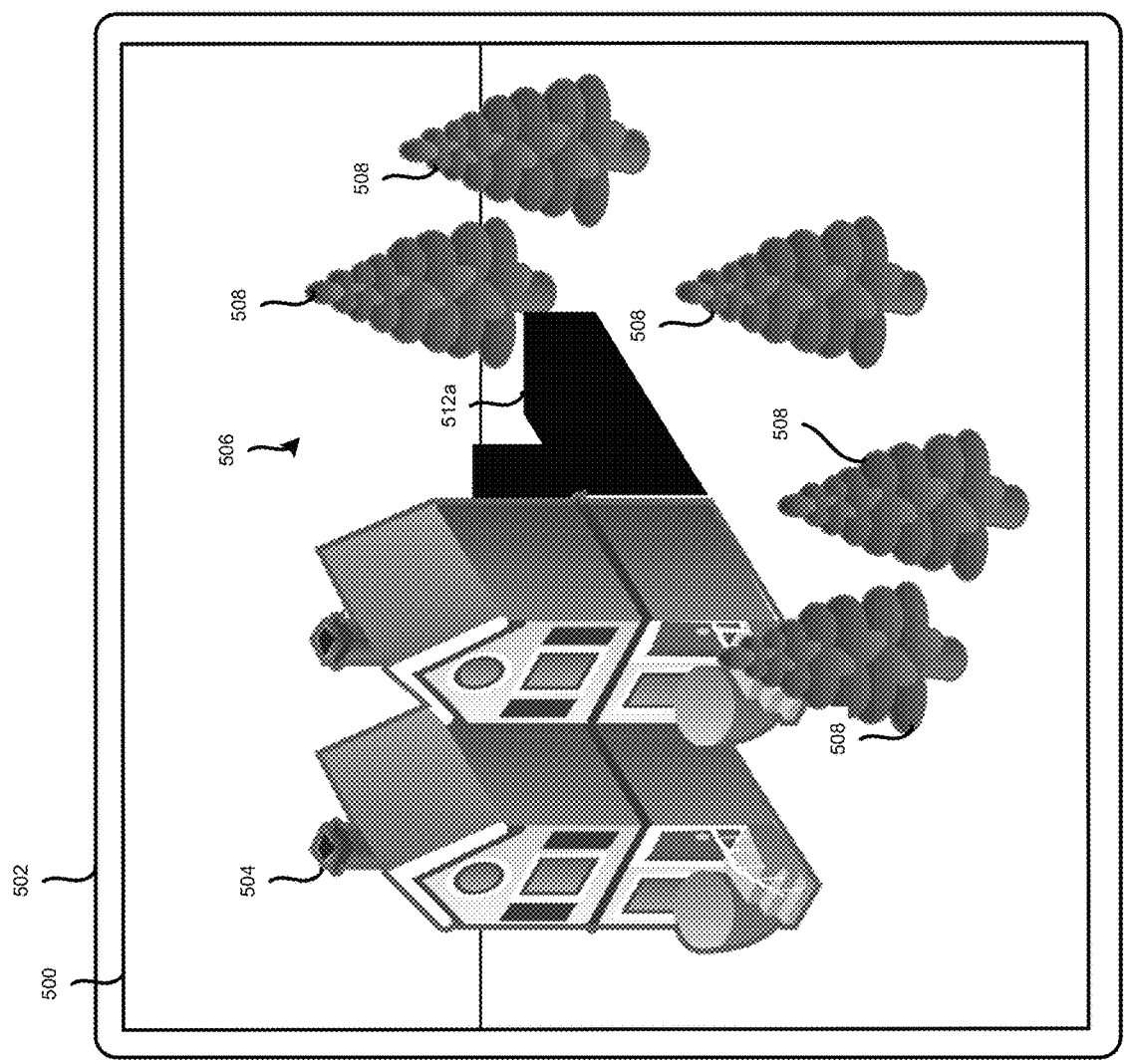
FIG. 5A illustrates a graphical user interface (GUI) during some embodiments of the method of FIG. 4, in accordance with some embodiments of the present disclosure.

FIG. 5A illustrates a graphical user interface 500 included on a display device 502 that is included on the display system 220 of FIG. 2. The graphical user interface 500 includes an example augmented reality asset 504. The augmented reality asset 504 may include a three-dimensional model of a townhouse that is positioned in an environment 506 that includes a plurality of real-world objects 508 (e.g., trees). The user computing device 120 that includes the display device 502 may include a light sensor in the sensor system 222 that may detect a light source, its direction, and position may be detected based on the orientation and position of the user computing device 120. The light source in the environment may be out of view of the display device 502. However, the light sensor may detect the light source and provide light sensor data to the contextual control engine 304. The light sensor data may be used to generate contextual information that may be used to update asset attributes, which may cause asset content (e.g., asset shadow content 512a) to be presented based on the position and direction of the light source, (e.g., position may be calculated based on the orientation and position of the user computing device 120 detected by a geolocation sensor and an orientation sensor (e.g., an IMU).

Figure 5B:
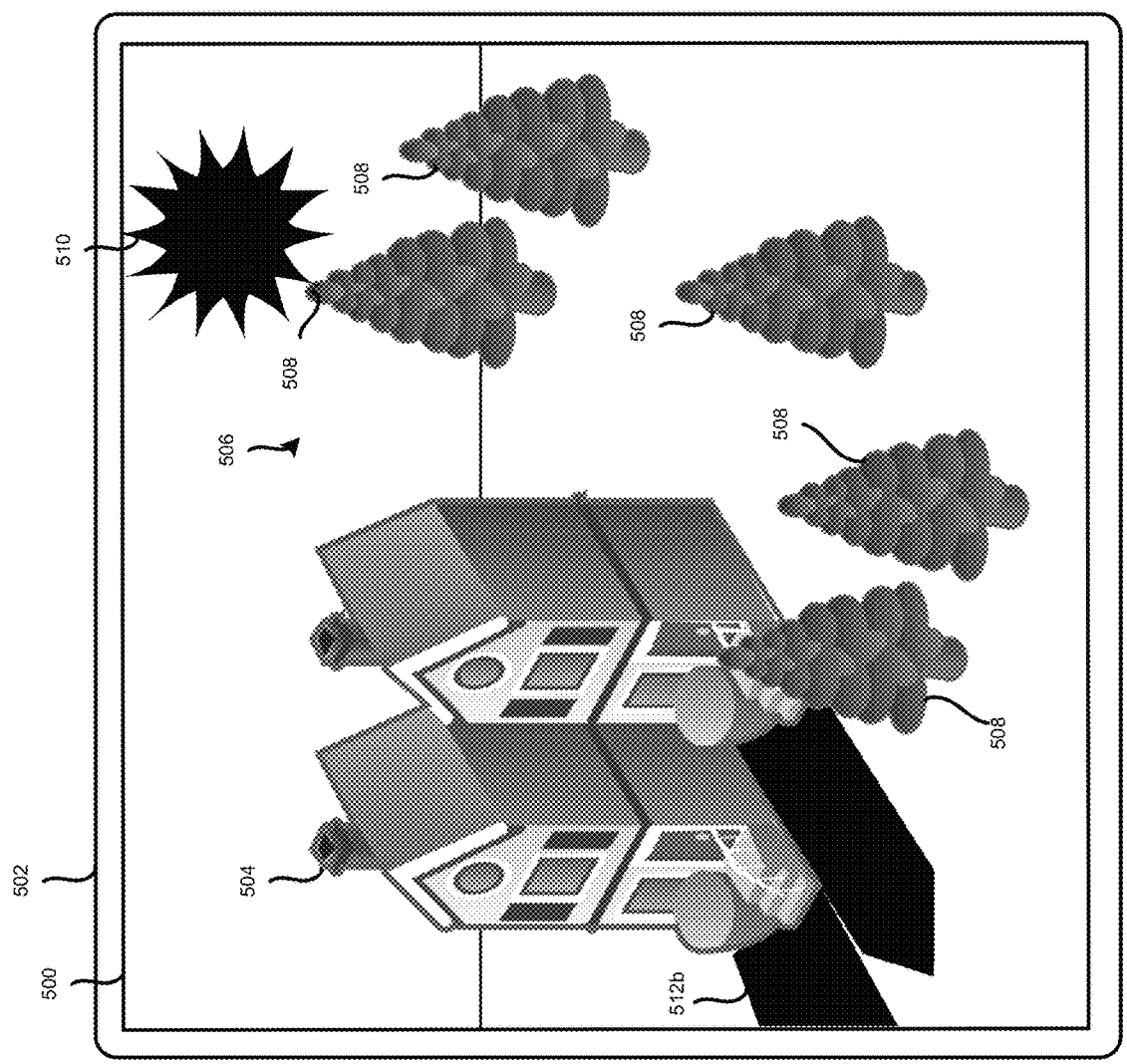
FIG. 5B illustrates a graphical user interface (GUI) during some embodiments of the method of FIG. 4, in accordance with some embodiments of the present disclosure.

FIG. 5B illustrates the graphical user interface 500 at a subsequent time where the light source 510 has changed positions or another light source is present in the environment 506. The change in position of the light source 510 may cause the contextual information to update, which causes the asset attributes to update, which causes the asset content to adjust from asset shadow content 512a to asset shadow content 512b. While a specific example of presenting an augmented reality asset 504 based on contextual information is discussed in FIGS. 5A and 5B, one of skill in the art in possession of the present disclosure will recognize that the contextual information relating to the environment in which the user computing device that is running an augmented application is located, may be obtained from various sensors and update the audio or visual content of an asset in various manners without departing from the scope of the present disclosure.

Figure 6:
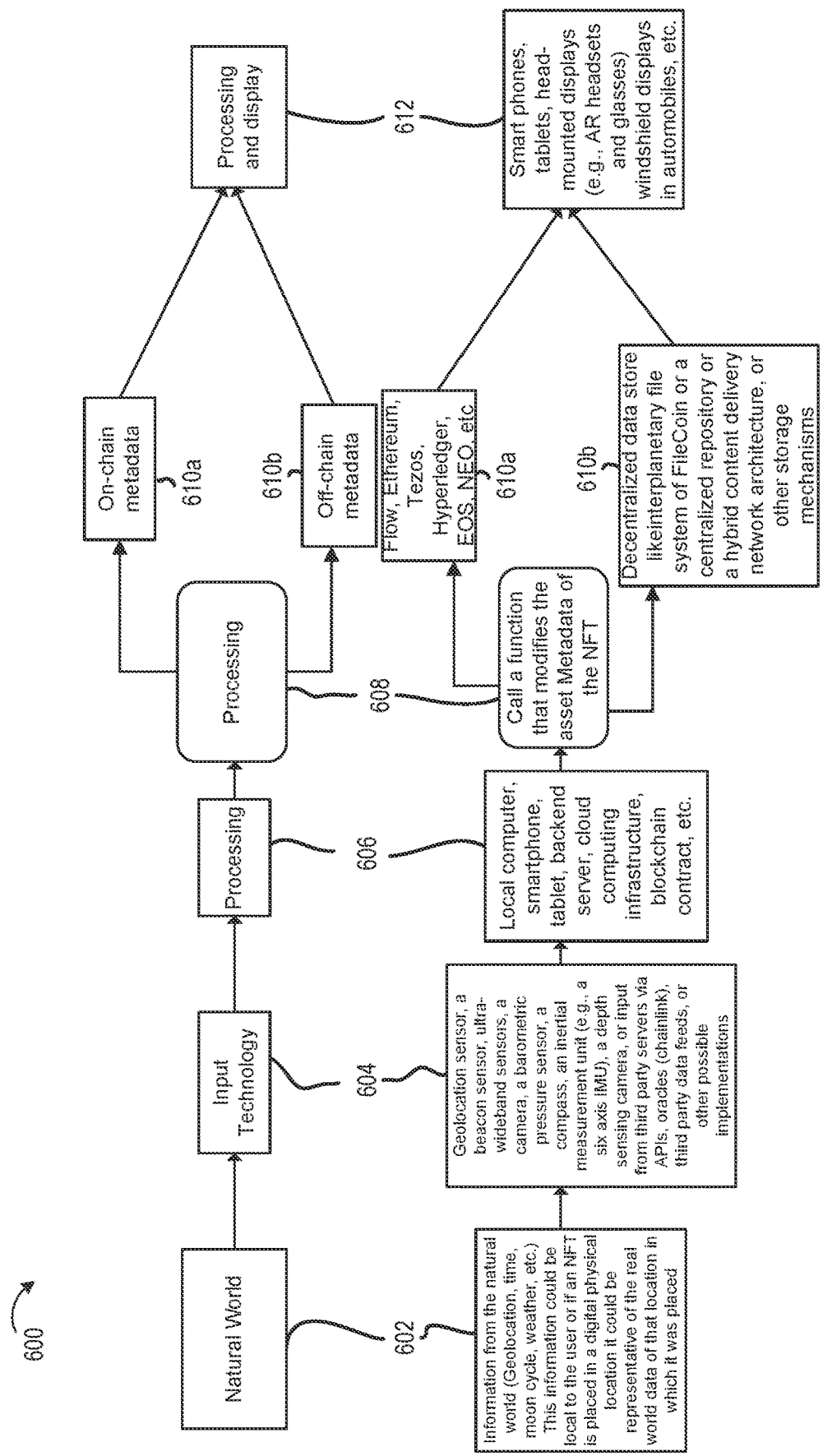
FIG. 6 is diagram illustrating an information flow of the method of FIG. 4, in accordance with some embodiments of the present disclosure.

FIG. 6 illustrates an example process 600 of the method 400 of FIG. 4. For example, information from the natural world at block 602 (e.g., geolocation, time, moon cycle, weather, or other contextual information) may be obtained by input technology at block 604. The information may be local to the user or if an NFT is placed in a digital physical location, the contextual information could be representative of the real-world data of that location in which it was placed. The input technology may include a geolocation sensor, a beacon sensor, ultra-wideband sensors, a camera, a barometric pressure sensor, a compass, an inertial measurement unit (e.g., a six axis IMU, a depth sensing camera, or input from third party servers via APIs, oracles (chainlink), third party data feeds, or other implementations that would be apparent to one of skill in the art in possession of the present disclosure. The processing components, at block 606 such as, for example, a local computer, a smartphone, a tablet, a backend server, cloud computing infrastructure, a blockchain virtual machine executing a smart contract, or other processing components may use the contextual information to call a function, at block 608, that modifies asset metadata or metadata of an NFT mapped to the asset. The function call may modify on-chain metadata, at block 610a, or off-chain metadata, at block 610b. The asset with the modified asset metadata may be processed and displayed at block 612 via a smart phone, a tablet, a head-mounted display, a windshield display in an automobile, or other display that would be apparent to one of skill in the art in possession of the present disclosure.

Figure 7A:
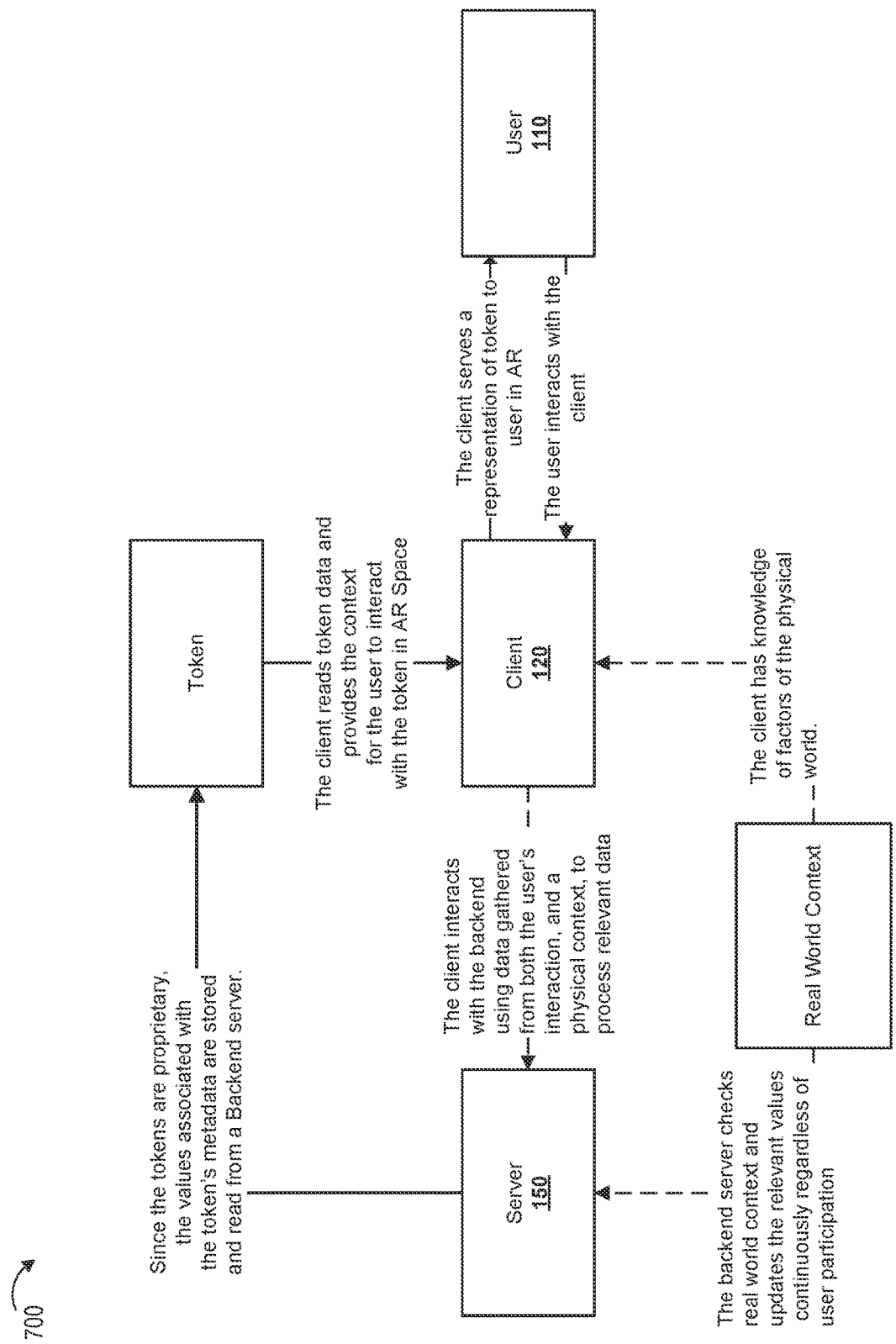
FIG. 7A is block diagram illustrating an example process of the method of FIG. 4, in accordance with some embodiments of the present disclosure.
Figure 7B:
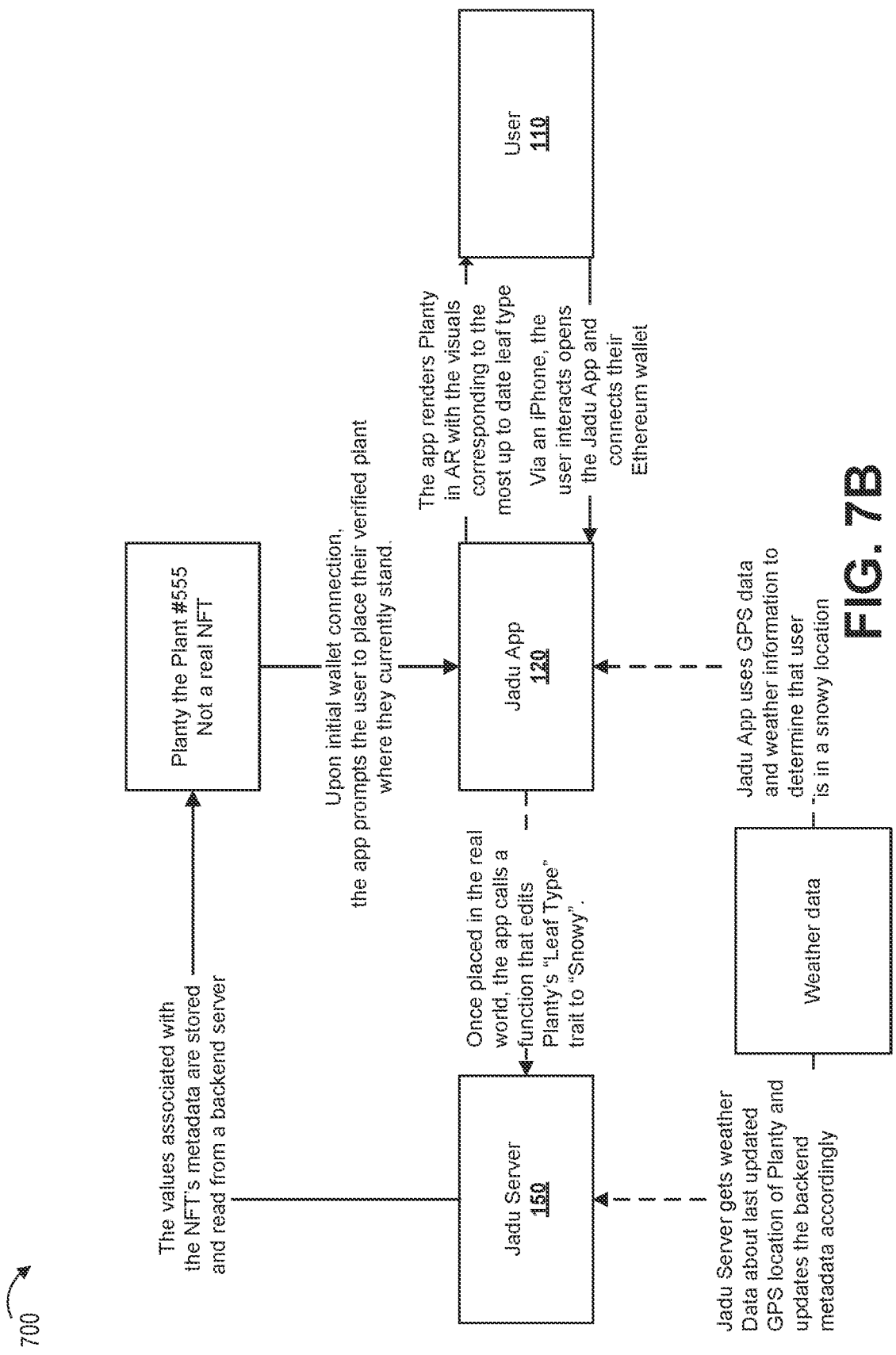
FIG. 7B is block diagram illustrating a specific example process of FIG. 7A, in accordance with some embodiments of the present disclosure.

FIG. 7A illustrates a block diagram of an example process 700 of method 400. Specifically, the process 700 illustrates an implementation where the server computing device 150 receives a function call to update attributes (e.g., NFT metadata) using contextual information received from the environment. For example, the server computing device 150 may update the attribute values, which are associated with an NFT's metadata. In some embodiments, the attribute values may be stored and read from the server computing device 150. The user computing device 120 may read the NFT metadata (e.g., attributes) to provide the context for the user to interact with the asset content mapped to the NFT in augmented reality space. FIG. 7B illustrates a specific example of the process 700 of FIG. 7A where a plant asset mapped to an NFT (e.g., Planty the Plant #555) is rendered with a "snowy leaf type" due to contextual information indicating that the user 110 is in a snowy location.

Figure 8A:
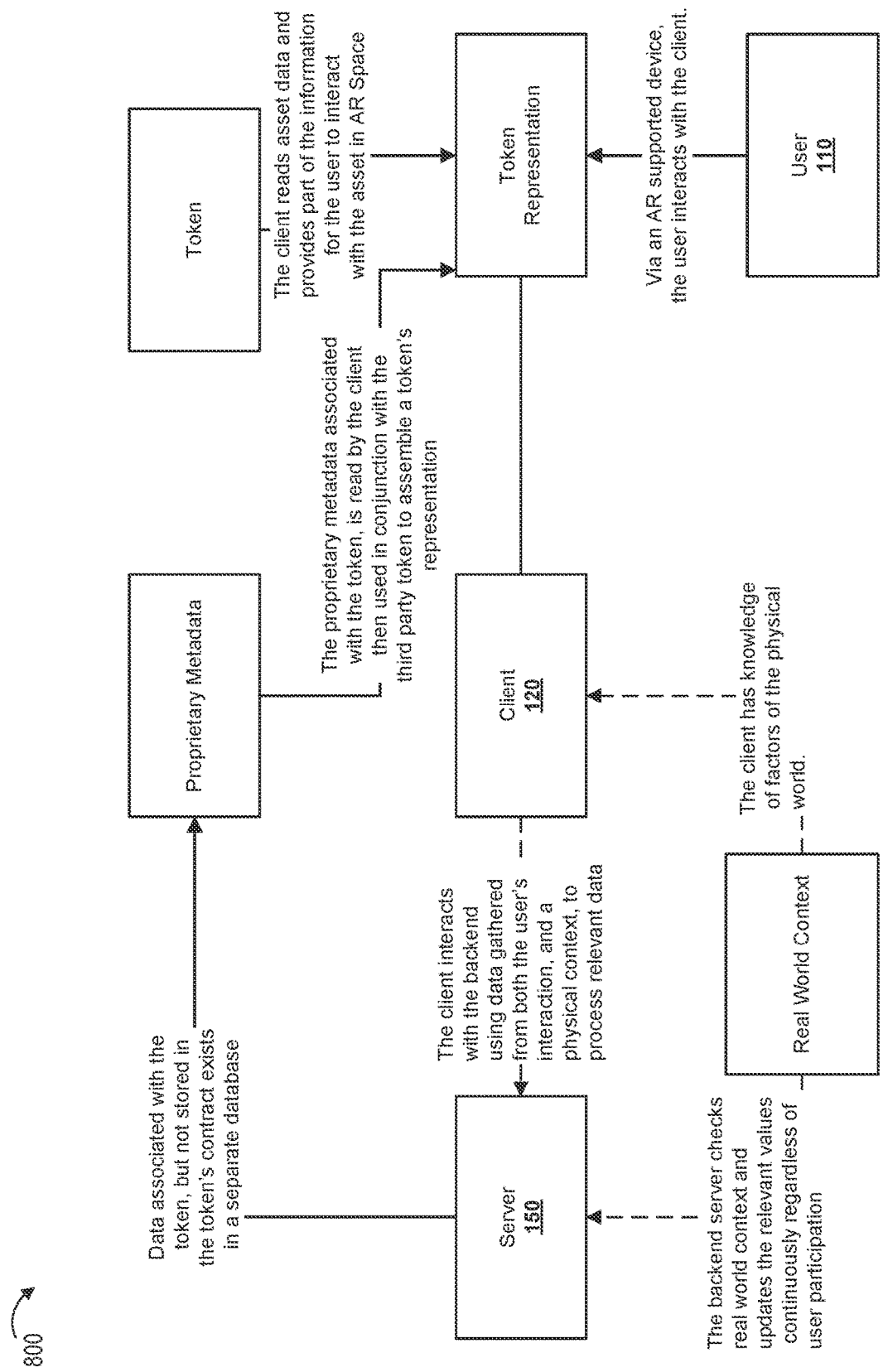
FIG. 8A is block diagram illustrating an example process of the method of FIG. 4, in accordance with some embodiments of the present disclosure.
Figure 8B:
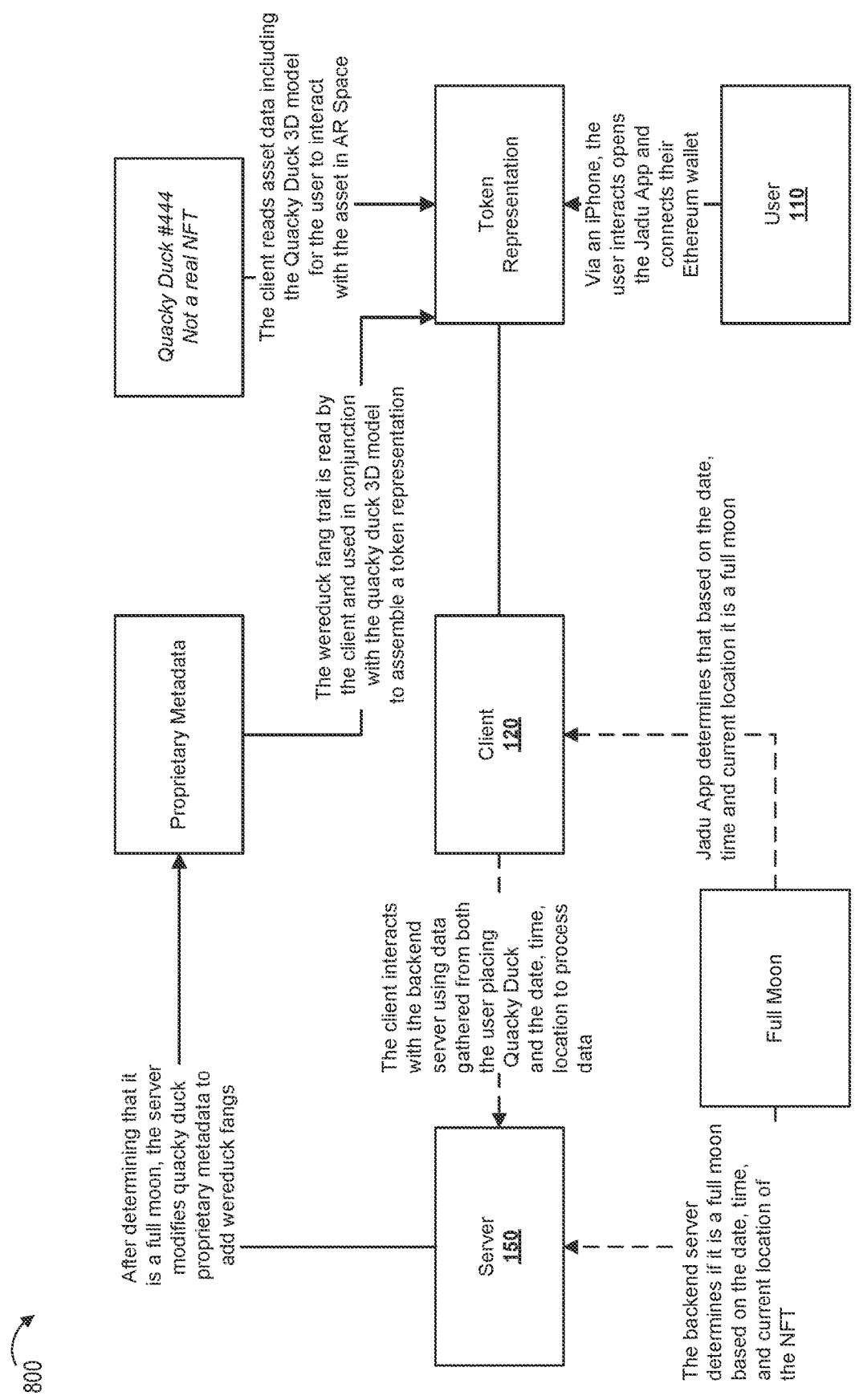
FIG. 8B is block diagram illustrating a specific example process of FIG. 8A, in accordance with some embodiments of the present disclosure.

FIG. 8A illustrates a block diagram of an example process 800 of method 400. Specifically, the process 800 illustrates an implementation where the server computing device 150 receives a function call to update attributes using contextual information received from the environment. In this example, the attributes or data associated with the asset and its mapped NFT is not stored in the smart contract for the NFT but exits in a separate database as "proprietary metadata". The user computing device 120 may obtain that proprietary metadata and the asset data associated with the NFT and combine both sets of data to generate the asset content in an augmented reality space. FIG. 8B illustrates a specific example of the process 800 of FIG. 8A where a character asset mapped to an NFT (e.g., Quacky Duck #444) is rendered with a "wereduck fangs" due to contextual information indicating that the user 110 is in full moon location at night. The "wereduck fangs" are rendered separate from the Quacky Duck 3D model and layered or assembled together to provide an augmented reality version of Quacky Duck with wereduck fangs.

Figure 9B:
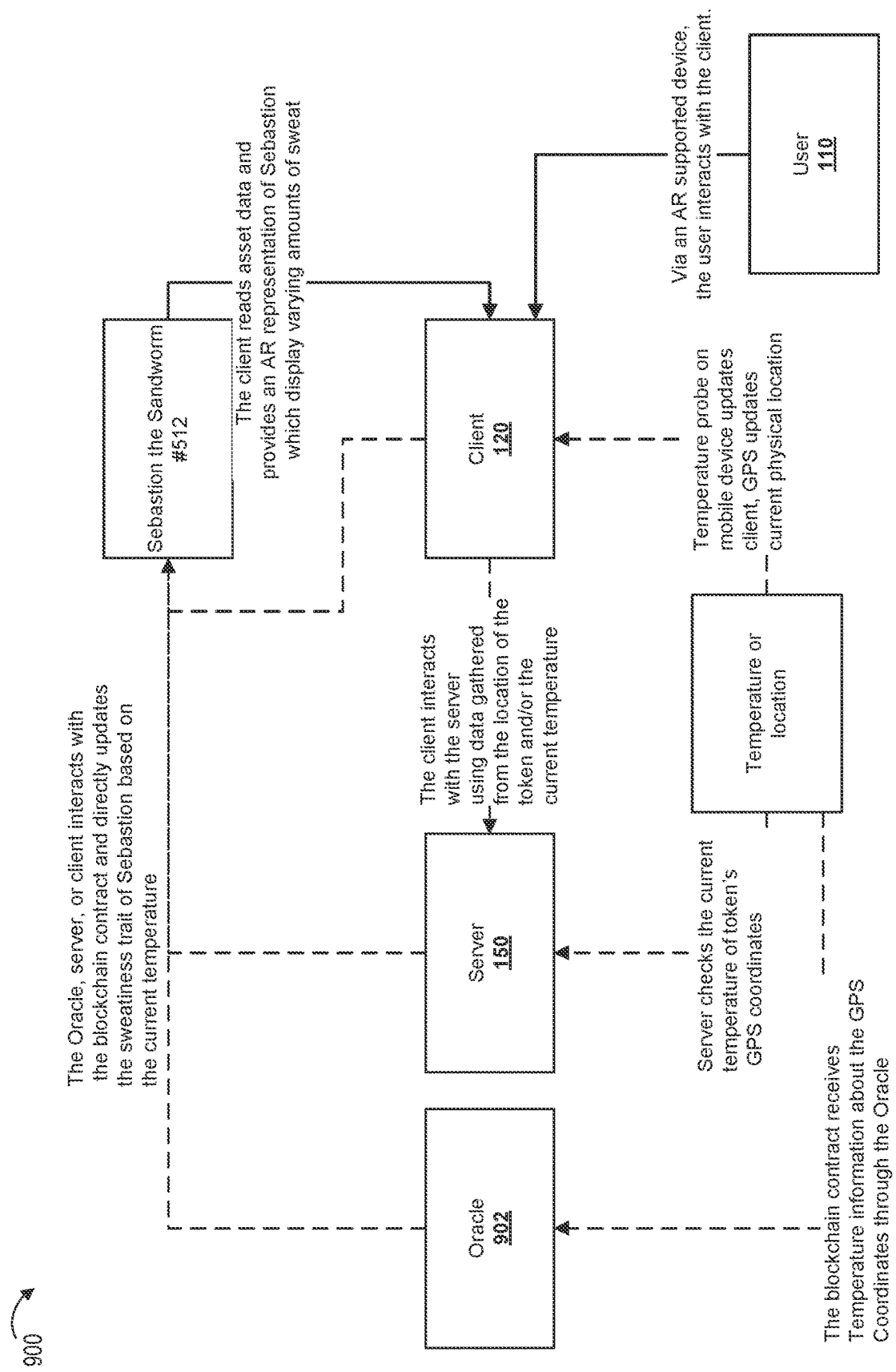
FIG. 9B is block diagram illustrating a specific example process of FIG. 9A, in accordance with some embodiments of the present disclosure.

FIG. 9A illustrates a block diagram of an example process 900 of method 400. Specifically, the process 900 illustrates an implementation where the server computing device 150 receives a function call to update attributes using contextual information received from the environment. In this example, the attributes or data associated with the asset is updated by direct interaction of an oracle 902, the server computing device 150, or the user computing device 120 with the blockchain contract associated with the NFT mapped to the asset content. The user computing device 120 may obtain the updated asset content when obtaining the NFT and provide the updated asset content in an augmented reality space. FIG. 9B illustrates a specific example of the process 900 of FIG. 9A where a character asset mapped to an NFT (e.g., Sebastion the Sandworm #512) is rendered with various degrees of "sweat" due to contextual information indicating a temperature of location that the user 110 located. The "sweat" version of "Sebastion the Sandworm" is obtained when the client reads asset data mapped to the NFT.

Figure 10:
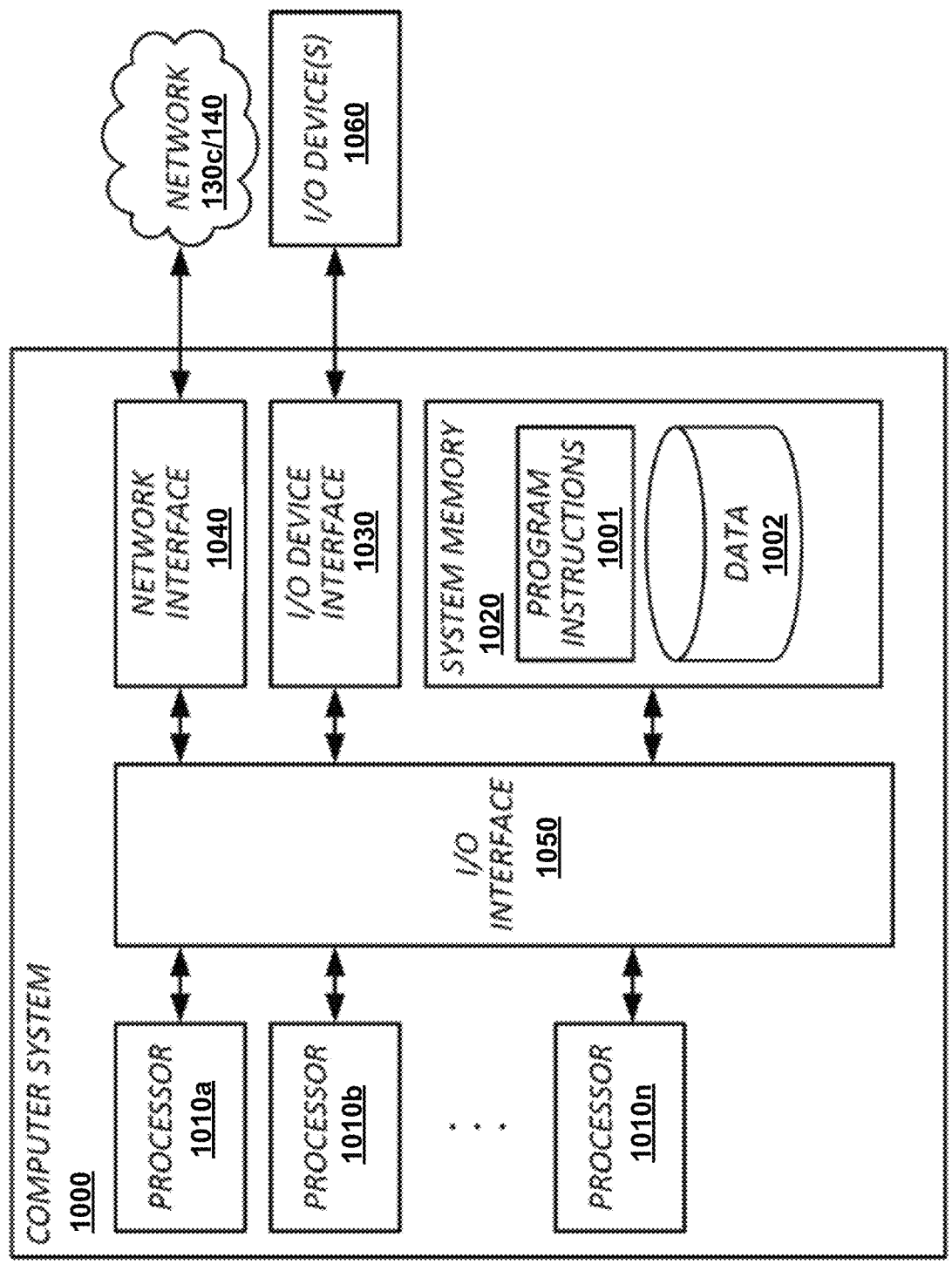
FIG. 10 is a block diagram of an example of a computing system with which the present techniques may be implemented, in accordance with some embodiments of the present disclosure.

FIG. 10 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output (I/O) device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computing system 1000. I/O devices may include devices that receive input (e.g., from a user) or output information (e.g., to a user). I/O devices 1060 may include, for example, graphical user interface presented on displays or projections (e.g., a cathode ray tube (CRT) or liquid crystal display (LCD) monitor, a head mounted display, an overhead projection, a 3D displays, an organic light-emitting diode (OLED) a quantum dot LED (QLED), an micro-LED (mLED)), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computing system 1000 through a wired or wireless connection. I/O devices 1060 may be connected to computing system 1000 from a remote location. I/O devices 1060 located on a remote computer system, for example, may be connected to computing system 1000 via a network and network interface 1040.

Network interface 1040 may include a network adapter that provides for connection of computing system 1000 to a network. Network interface 1040 may facilitate data exchange between computing system 1000 and other devices connected to the network. Network interface 1040 may support wired or wireless communication. The network may include an electronic communication network, such as the Internet, a local area network (LAN), a personal area network, a wide area network (WAN), a cellular communications network, or the like.

System memory 1020 may be configured to store program instructions 1001 or data 1010. Program instructions 1001 may be executable by a processor (e.g., one or more of processors 1010a-1010n) to implement one or more embodiments of the present techniques. Instructions 1001 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM or DVD-ROM, hard-drives, solid state drives, flash drives,), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard, a variant of the Universal Serial Bus (USB) standard, a variant of the Bluetooth standard, or other I/O interface standard that would be apparent to one of skill in the art in possession of the present disclosure.

Embodiments of the techniques described herein may be implemented using a single instance of computing system 1000 or multiple computing systems 1000 configured to host different portions or instances of embodiments. Multiple computing systems 1000 may provide for parallel or sequential processing/execution of one or more portions of the techniques described herein.

Those skilled in the art will appreciate that computing system 1000 is merely illustrative and is not intended to limit the scope of the techniques described herein. Computing system 1000 may include any combination of devices or software that may perform or otherwise provide for the performance of the techniques described herein. For example, computing system 1000 may include or be a combination of a cloud-computing system, a data center, a server rack, a server, a virtual server, a desktop computer, a laptop computer, a tablet computer, a server device, a client device, a mobile telephone, a wearable device, a personal digital assistant (PDA), a mobile audio or video player, a game console, a vehicle-mounted computer, or a global positioning system (GPS), or the like. Computing system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 1000 may be transmitted to computing system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description on a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A non-transitory, machine-readable medium storing instructions that, when executed by one or more processors, effectuate operations comprising: identifying, with a computing system, a blockchain-based token mapped to an asset configured to be presented in an augmented reality application; obtaining, with the computing system, contextual information indicative of a physical context of a physical geolocation of a display upon which the augmented reality application is to present the asset; causing, with the computing system, visual attributes or audio attributes of the asset to be determined based on the contextual information; and causing, with the computing system, the asset to be presented with the display according to the visual attributes or the audio attributes.
2. The medium of embodiment 1, wherein the operations further comprise: obtaining, with the computing system, second contextual information of the physical context of the physical geolocation of the display upon which the augmented reality application is to present the asset; causing, with the computing system, the visual attributes or the audio attributes of the asset to be updated based on the second contextual information; and causing, with the computing system, the asset to be presented with the display according to the updated visual attributes or the updated audio attributes.
3. The medium of any one of embodiments 1 and 2, wherein the blockchain-based token includes a nonfungible token mapped to the asset.
4. The medium of any one of embodiments 1-3, wherein the contextual information is indicative of virtual context of a second asset in the physical geolocation.
5. The medium of any one of embodiments 1-4, wherein the operations further comprise: compiling, by the computing system, contextual control scripts into a smart contract that is executable on a blockchain computing platform storing the blockchain-based token that is mapped to the asset.
6. The medium of embodiment 5, wherein the operations further comprise: calling, by the computing system, an address on the blockchain computing platform that is associated with the blockchain-based token that causes the contextual control script to run; and supplying, by the computing system, corresponding arguments.
7. The medium of any one of embodiments 1-6, wherein the contextual information is obtained from a sensor system included on a first user computing device that includes the display.
8. The medium of any one of embodiments 1-7, wherein the contextual information is obtained from a sensor system included on a second user computing device that is separate from the first user computing device.
9. The medium of any one of embodiments 1-8, wherein the contextual information is obtained from an oracle service.
10. The medium of any one of embodiments 1-9, wherein the identifying the asset configured to be presented in the augmented reality application is based on the position and orientation of a user computing device that includes the display.
11. The medium of any one of embodiments 1-10, wherein the identifying the asset configured to be presented in the augmented reality application is based on a nonfungible token mapped to the asset being associated with an electronic wallet of a user that is associated with a user computing device that includes the display.

12. The medium of any one of embodiments 1-11, wherein the operations further comprise: receiving, by the computing system, location information associated with the display of a user computing device that is operating the augmented reality application; and providing, by the computing system, a plurality of asset profiles associated with the geolocation or a geofence in which the location information indicates the display is located, wherein the asset is identified from one of the plurality of asset profiles.

13. The medium of any one of embodiments 1-12, wherein the user computing device performs at least a portion of the causing the visual attributes or the audio attributes of the asset to be determined based on the contextual information.

14. The medium of any one of embodiments 1-13, wherein the operations further comprise: updating, by the computing system, the visual attributes or the audio attributes of the asset and that is included in proprietary metadata associated with the asset; providing, by the computing system, the visual attributes or the audio attributes of the asset to a user computing device coupled with the display, wherein the user computing device obtains second visual attributes or second audio attributes associated with the asset and renders the asset according to the visual attributes or the audio attributes and the second visual attributes or the second audio attributes.

15. The medium of embodiment 14, wherein the second visual attributes or the second audio attributes are identified in a smart contract for the blockchain-based token.

16. The medium of any one of embodiments 1-15, wherein the causing the visual attributes or the audio attributes of the asset to be determined based on the contextual information includes directly updating the visual attributes or the audio attributes in a smart contract on a blockchain for the blockchain-based token mapped to the asset.

17. The medium of embodiment 16, wherein the directly updating is performed by at least one of an oracle computing device, a server computing device, or a user computing device.

18. The medium of any one of embodiments 1-17, wherein the operations comprise steps for causing the visual attributes or the audio attributes of the asset to be determined based on the contextual information.

19. The medium of any one of embodiments 1-18, wherein the operations further comprise steps for causing the asset to be presented with the display according to the visual attributes or the audio attributes.

20. A method, comprising: the operations of any one of embodiments 1-19.

21. A system, comprising: one or more processors; and memory storing instructions that when executed by the processors cause the processors to effectuate operations comprising: the operations of any one of embodiments 1-19.

What is claimed is:

1. A non-transitory, machine-readable medium storing instructions that, when executed by one or more processors, effectuate operations comprising:
identifying, with a computing system, a blockchain-based non-fungible token mapped to a digital asset that includes digital asset content configured to be presented with a display via an augmented reality application to augment physical content of a physical geolocation presented on the display, wherein the blockchain-based non-fungible token includes one or more contextual control scripts that input contextual information indicative of the physical content of the physical geolocation and that output arguments to adjust asset attributes associated with the digital asset to affect mutation of audio content or visual content that is included in the digital asset content and that is to be presented via the augmented reality application on the display;
obtaining, with the computing system, contextual information indicative of a physical context of physical content of a physical geolocation presented via a display upon which the augmented reality application is to present the digital asset content to augment the physical content;
calling, by the computing system, an address on a blockchain computing platform that is associated with the blockchain-based non-fungible token and that causes the one or more contextual control scripts to run with the contextual information;
supplying, by the computing system, corresponding arguments to adjust the asset attributes according to the one or more contextual control scripts and the contextual information;
causing, with the computing system and based on the asset attributes, a mutation of previously provided audio content or previously displayed visual content that is included in the digital asset content to provide audio content or visual content; and
causing, with the computing system, the digital asset content to be presented via the display according to the visual content or the audio content thereby augmenting the physical content presented via the display with the digital asset associated with the blockchain-based non-fungible token.

2. The medium of claim 1, wherein the operations further comprise:
obtaining, with the computing system, second contextual information of the physical context the physical content of the physical geolocation presented via the display upon which the augmented reality application is to present the digital asset content to augment the physical content;
causing, with the computing system, the visual content or the audio content of the digital asset to be updated based on the second contextual information; and
causing, with the computing system, the digital asset content to be presented via the display according to the updated visual content or the updated audio content thereby augmenting the physical content presented via the display.

3. The medium of claim 1, wherein the display is a first display included on a first user computing device, and wherein the operations further comprise causing, with the computing system, the digital asset content to be presented via a second display that is included on a second user computing device according to the visual content or the audio content that was mutated thereby augmenting physical content presented via the second display with the digital asset associated with the blockchain-based non-fungible token.

4. The medium of claim 1, wherein the contextual information is indicative of virtual context of a second digital asset in the physical geolocation.

5. The medium of claim 1, wherein the operations further comprise:
compiling, by the computing system, contextual control scripts into a smart contract that is executable on the blockchain computing platform storing the blockchain-based non-fungible token that is mapped to the digital asset.

6. The medium of claim 1, wherein the contextual information is obtained from a sensor system included on a first user computing device that includes the display.

7. The medium of claim 1, wherein the contextual information is obtained from a sensor system included on a second user computing device that is separate from a first user computing device that provides the display.

8. The medium of claim 1, wherein the contextual information is obtained from an oracle service.

9. The medium of claim 1, wherein the identifying the digital asset configured to be presented in the augmented reality application is based on a position and an orientation of a user computing device that includes the display.

10. The medium of claim 1, wherein the blockchain-based non-fungible token is mapped to the digital asset being associated with an electronic wallet of a user that is associated with a user computing device that includes the display.

11. The medium of claim 1, wherein the operations further comprise:
receiving, by the computing system, location information associated with the display of a user computing device that is operating the augmented reality application; and
providing, by the computing system, a plurality of digital asset profiles associated with the physical geolocation or a geofence in which the location information indicates the display is located, wherein the digital asset is identified from one of the plurality of digital asset profiles.

12. The medium of claim 1, wherein a user computing device that provides the display performs at least a portion of the causing the visual content or the audio content of the digital asset to be determined based on the asset attributes.

13. The medium of claim 1, wherein the operations further comprise:
updating, by the computing system, the visual content or the audio content of the digital asset and that is included in proprietary metadata associated with the digital asset; and
providing, by the computing system, the visual content or the audio content of the digital asset to a user computing device coupled with the display, wherein the user computing device obtains second visual content or second audio content associated with the digital asset and renders the digital asset according to the visual content or the audio content and the second visual content or the second audio content.

14. The medium of claim 13, wherein the second visual content or the second audio content are identified in a smart contract for the blockchain-based non-fungible token.

15. The medium of claim 1, wherein the causing the visual content or the audio content of the digital asset to be determined based on the contextual information includes directly updating the visual content or the audio content in a smart contract on a blockchain for the blockchain-based non-fungible token mapped to the digital asset, wherein the smart contract performs the supplying the corresponding arguments to adjust the asset attributes according to the one or more contextual control scripts and the contextual information.

16. The medium of claim 15, wherein the directly updating is performed by at least one of an oracle computing device, a server computing device, or a user computing device.

17. The medium of claim 1, wherein the operations comprise steps for causing the visual content or the audio content of the digital asset to be determined based on the contextual information.

18. The medium of claim 1, wherein the operations further comprise steps for causing the digital asset to be presented with the display according to the visual content or the audio content.

19. A method, comprising:
identifying, with a computing system, a blockchain-based non-fungible token mapped to a digital asset that includes digital asset content configured to be presented with a display via an augmented reality application to augment physical content of a physical geolocation presented on the display, wherein the blockchain-based non-fungible token includes one or more contextual control scripts that input contextual information indicative of the physical content of the physical geolocation and that output arguments to adjust asset attributes associated with the digital asset to affect mutation of audio content or visual content that is included in the digital asset content and that is to be presented via the augmented reality application on the display;
obtaining, with the computing system, contextual information indicative of a physical context of physical content of a physical geolocation presented via a display upon which the augmented reality application is to present the digital asset content to augment the physical content;
calling, by the computing system, an address on a blockchain computing platform that is associated with the blockchain-based non-fungible token and that causes the one or more contextual control scripts to run with the contextual information;
supplying, by the computing system, corresponding arguments to adjust the asset attributes according to the one or more contextual control scripts and the contextual information;
causing, with the computing system and based on the asset attributes, a mutation of previously provided audio content or previously displayed visual content that is included in the digital asset content to provide audio content or visual content; and
causing, with the computing system, the digital asset content to be presented via the display according to the visual content or the audio content thereby augmenting the physical content presented via the display with the digital asset associated with the blockchain-based non-fungible token.

20. The method of claim 19, further comprising:
obtaining, with the computing system, second contextual information of the physical context the physical content of the physical geolocation presented via the display upon which the augmented reality application is to present the digital asset content to augment the physical content;
causing, with the computing system, the visual content or the audio content of the digital asset to be updated based on the second contextual information; and
causing, with the computing system, the digital asset content to be presented via the display according to the updated visual content or the updated audio content thereby augmenting the physical content presented via the display.

21. The method of claim 19, wherein the contextual information is indicative of virtual context of a second digital asset in the physical geolocation.

22. The method of claim 19, further comprising:
compiling, by the computing system, contextual control scripts into a smart contract that is executable on the blockchain computing platform storing the blockchain-based non-fungible token that is mapped to the digital asset.

23. The method of claim 19, wherein the contextual information is obtained from a sensor system included on a first user computing device that includes the display.

24. The method of claim 19, wherein the contextual information is obtained from a sensor system included on a second user computing device that is separate from a first user computing device that provides the display.

25. The method of claim 19, wherein the contextual information is obtained from an oracle service.

26. The method of claim 19, wherein the identifying the digital asset configured to be presented in the augmented reality application is based on a position and an orientation of a user computing device that includes the display.

27. The method of claim 19, wherein the blockchain-based non-fungible token is mapped to the digital asset being associated with an electronic wallet of a user that is associated with a user computing device that includes the display.

28. The method of claim 19, further comprising:
receiving, by the computing system, location information associated with the display of a user computing device that is operating the augmented reality application; and
providing, by the computing system, a plurality of digital asset profiles associated with the physical geolocation or a geofence in which the location information indicates the display is located, wherein the digital asset is identified from one of the plurality of digital asset profiles.

29. The method of claim 19, wherein a user computing device that provides the display performs at least a portion of the causing the visual content or the audio content of the digital asset to be determined based on the asset attributes.

30. The method of claim 19, further comprising:
updating, by the computing system, the visual content or the audio content of the digital asset and that is included in proprietary metadata associated with the digital asset; and
providing, by the computing system, the visual content or the audio content of the digital asset to a user computing device coupled with the display, wherein the user computing device obtains second visual content or second audio content associated with the digital asset and renders the digital asset according to the visual content or the audio content and the second visual content or the second audio content.

31. The method of claim 30, wherein the second visual content or the second audio content are identified in a smart contract for the blockchain-based non-fungible token.

32. The method of claim 19, wherein the causing the visual content or the audio content of the digital asset to be determined based on the contextual information includes directly updating the visual content or the audio content in a smart contract on a blockchain for the blockchain-based non-fungible token mapped to the digital asset, wherein the smart contract performs the supplying the corresponding arguments to adjust the asset attributes according to the one or more contextual control scripts and the contextual information.

33. The method of claim 32, wherein the directly updating is performed by at least one of an oracle computing device, a server computing device, or a user computing device.

34. The method of claim 19, further comprising steps for causing the visual content or the audio content of the digital asset to be determined based on the contextual information.

35. The method of claim 19, further comprising steps for causing the digital asset to be presented with the display according to the visual content or the audio content.

36. The method of claim 19, wherein the display is a first display included on a first user computing device, and wherein the operations further comprise causing, with the computing system, the digital asset content to be presented via a second display that is included on a second user computing device according to the visual content or the audio content that was mutated thereby augmenting physical content presented via the second display with the digital asset associated with the blockchain-based non-fungible token.

* * * * *